United States Patent
Akeley

(10) Patent No.: US 9,305,375 B2
(45) Date of Patent: Apr. 5, 2016

(54) HIGH-QUALITY POST-RENDERING DEPTH BLUR

(71) Applicant: Lytro, Inc., Mountain View, CA (US)

(72) Inventor: Kurt Akeley, Saratoga, CA (US)

(73) Assignee: Lytro, Inc., Mountain View, CA (US)

( * ) Notice: Subject to any disclaimer, the term of this patent is extended or adjusted under 35 U.S.C. 154(b) by 140 days.

(21) Appl. No.: 14/224,763

(22) Filed: Mar. 25, 2014

(65) Prior Publication Data
US 2015/0279056 A1  Oct. 1, 2015

(51) Int. Cl.
| | |
|---|---|
| *G06T 11/00* | (2006.01) |
| *G06T 5/00* | (2006.01) |
| *G06T 15/00* | (2011.01) |
| *G06T 5/40* | (2006.01) |
| *G06T 15/50* | (2011.01) |
| *G06T 11/60* | (2006.01) |
| *G09G 5/02* | (2006.01) |

(52) U.S. Cl.
CPC ............... *G06T 11/001* (2013.01); *G06T 5/007* (2013.01)

(58) Field of Classification Search
CPC combination set(s) only.
See application file for complete search history.

(56) References Cited

U.S. PATENT DOCUMENTS

| | | | |
|---|---|---|---|
| 4,661,986 | A | 4/1987 | Adelson |
| 5,076,687 | A | 12/1991 | Adelson |
| 5,282,045 | A | 1/1994 | Mimura et al. |
| 5,748,371 | A | 5/1998 | Cathey, Jr. et al. |
| 5,949,433 | A | 9/1999 | Klotz |
| 6,023,523 | A | 2/2000 | Cohen et al. |
| 6,034,690 | A | 3/2000 | Gallery et al. |
| 6,097,394 | A | 8/2000 | Levoy et al. |
| 6,201,899 | B1 | 3/2001 | Bergen |
| 6,320,979 | B1 | 11/2001 | Melen |
| 6,900,841 | B1 | 5/2005 | Mihara |
| 6,927,922 | B2 | 8/2005 | George et al. |
| 7,034,866 | B1 | 4/2006 | Colmenarez et al. |
| 7,336,430 | B2 | 2/2008 | George |
| 7,620,309 | B2 | 11/2009 | Georgiev |
| 7,623,726 | B1 | 11/2009 | Georgiev |

(Continued)

FOREIGN PATENT DOCUMENTS

| | | |
|---|---|---|
| WO | 03052465 | 6/2003 |
| WO | 2006039486 | 4/2006 |

(Continued)

OTHER PUBLICATIONS

Munkberg, Jacob, et al., "Layered Reconstruction for Defocus and Motion Blur", EGSR 2014, pp. 1-12.

(Continued)

*Primary Examiner* — Wesner Sajous
(74) *Attorney, Agent, or Firm* — Raubvogel Law Office

(57) ABSTRACT

The present invention may provide techniques for blurring an image. The image may be a light field image with color values and depth values for each pixel. The method may include retrieving the image and calculating a blurred color value of a subject pixel of the image. Calculating the blurred color value may include calculating first and second circles of confusion proximate coordinates of the subject pixel for a first depth and second depth greater than the first depth. Color values may be retrieved for first and second sets of pixels within the first and second circles of confusion with depth values proximate the first and second depths, respectively. The second set of pixels may not include pixels occluded by the first set of pixels. The blurred color value may be selected based on the color values of the first and second sets of pixels.

28 Claims, 14 Drawing Sheets

(56) References Cited

U.S. PATENT DOCUMENTS

| | | | |
|---|---|---|---|
| 7,936,392 B2 | 5/2011 | Ng et al. | |
| 7,949,252 B1 | 5/2011 | Georgiev | |
| 8,155,478 B2 | 4/2012 | Vitsnudel et al. | |
| 8,189,089 B1 | 5/2012 | Georgiev et al. | |
| 8,290,358 B1 | 10/2012 | Georgiev | |
| 8,559,705 B2 | 10/2013 | Ng | |
| 8,724,014 B2 | 5/2014 | Ng et al. | |
| 2003/0117511 A1 | 6/2003 | Belz et al. | |
| 2003/0123700 A1 | 7/2003 | Wakao | |
| 2004/0114176 A1 | 6/2004 | Bodin et al. | |
| 2006/0248348 A1 | 11/2006 | Wakao et al. | |
| 2007/0252074 A1 | 11/2007 | Ng et al. | |
| 2007/0269108 A1 | 11/2007 | Steinberg et al. | |
| 2008/0131019 A1 | 6/2008 | Ng | |
| 2008/0226274 A1 | 9/2008 | Spielberg | |
| 2008/0277566 A1 | 11/2008 | Utagawa | |
| 2009/0128669 A1 | 5/2009 | Ng et al. | |
| 2009/0140131 A1 | 6/2009 | Utagawa | |
| 2010/0026852 A1 | 2/2010 | Ng et al. | |
| 2012/0327222 A1 | 12/2012 | Ng et al. | |
| 2013/0041215 A1* | 2/2013 | McDowall | G02B 27/283 600/109 |
| 2014/0013273 A1 | 1/2014 | Ng | |
| 2014/0028892 A1* | 1/2014 | Ng | G02B 27/0075 348/336 |
| 2014/0267243 A1* | 9/2014 | Venkataraman | G06T 7/0065 345/419 |
| 2014/0340390 A1* | 11/2014 | Lanman | G06T 15/04 345/419 |
| 2015/0130995 A1* | 5/2015 | Nishiyama | H04N 5/2354 348/370 |
| 2015/0178923 A1* | 6/2015 | Liang | H04N 5/2254 348/175 |

FOREIGN PATENT DOCUMENTS

| | | |
|---|---|---|
| WO | 2007092545 | 8/2007 |
| WO | 2007092581 | 8/2007 |

OTHER PUBLICATIONS

Tao, Michael, et al., "Depth from Combining Defocus and Correspondence Using Light-Field Cameras", Dec. 2013.

Bae, S., et al., "Defocus Magnification", Computer Graphics Forum, vol. 26, Issue 3 (Proc. of Eurographics 2007), pp. 1-9.

Bolles, R., et al., "Epipolar-Plane Image Analysis: An Approach to Determining Structure from Motion", International Journal of Computer Vision, 1, 7-55 (1987).

Cozzi, Patrick et al., "Depth of Field with Bokeh Rendering." OpenGL Insights. Boca Raton, FL: CRC Press, 2012.

Fernando, Randima. "Depth of Field: A Survey of Techniques." GPU Gems. Boston, MA: Addison-Wesley, 2004.

Haeberli, P., "A Multifocus Method for Controlling Depth of Field" GRAPHICA Obscura, 1994, pp. 1-3.

Levin, A., et al., "Image and Depth from a Conventional Camera with a Coded Aperture", SIGGRAPH 2007, pp. 1-9.

Levoy, M., et al., "Light Field Microscopy," ACM Transactions on Graphics, vol. 25, No. 3, Proceedings SIGGRAPH 2006.

Levoy, M., et al.,"Light Field Rendering" SIGGRAPH 96 Proceeding, 1996. pp. 31-42.

Nguyen, Hubert. "Practical Post-Process Depth of Field." GPU Gems 3. Upper Saddle River, NJ: Addison-Wesley, 2008.

Raskar, Ramesh et al., "Non-photorealistic Camera: Depth Edge Detection and Stylized Rendering using Multi-Flash Imaging", SIGGRAPH 2004.

SimpleViewer, "Tiltview", http://www.simpleviewer.net/tiltviewer. Retrieved Jan. 2013.

* cited by examiner

HIGH-QUALITY POST-RENDERING DEPTH BLUR

FIELD OF THE INVENTION

The present invention relates to systems and methods for processing and displaying light field image data.

BACKGROUND

In conventional photography, the camera must typically be focused at the time the photograph is taken. The resulting image may have only color data for each pixel; accordingly, any object that was not in focus when the photograph was taken cannot be brought into sharper focus because the necessary data does not reside in the image.

By contrast, light field images typically encode additional data for each pixel related to the trajectory of light rays incident to that pixel when the light field image was taken. This data can be used to manipulate the light field image through the use of a wide variety of rendering techniques that are not possible to perform with a conventional photograph. In some implementations, a light field image may be refocused and/or altered to simulate a change in the center of perspective (CoP) of the camera that received the image.

As part of such rendering, or as a subsequent step, it may be useful to blur the light field image, or a portion of the light field image. Blurring may entail mixing the color value of a pixel with those of surrounding pixels to make an object appear less clear. In order for blur in a light field image to be convincing, the depth of objects may need to be taken into account. For example, objects closer to the focus depth of the light field image may receive less blurring, while those further from the focus depth may receive more blurring. Thus, if applied to light field images, traditional naive blurring techniques may display noticeable inaccuracies.

Raytracing techniques, which process objects in the light field image based on depth, may provide greater accuracy by properly taking into account object depth and/or occlusion, but may also require significant computational power in order to do so. Hence, such techniques may be time consuming and may not be usable for real time manipulation of the light field image. Accordingly, it would be advantageous to provide blurring systems and methods for light field images that overcome the drawbacks of conventional techniques.

SUMMARY

According to various embodiments, the system and method of the present invention provide mechanisms for blurring an image such as a light field image. Blurring may be done post-rendering, i.e., after one or more other modifications such as a simulated change to the center of perspective (CoP) of the image. This may provide for greater flexibility and performance in image processing.

In some embodiments, blurring may be done through the use of a "mesh image" which may contain not only color values (for example, red, green, and blue, or "RGB" values) but also depth values ("Z" values). The depth values may record the depth of each pixel within the image (i.e., distance from the camera). The image may first be retrieved from the memory of a camera, a computing device, or another element.

In order to blur the image, a blurred color value may be calculated for some or all of the pixels of the image. The blurred color value for a given subject pixel may be calculated by analyzing circles of confusion, centered on the subject pixel, for each of a plurality of depths within the image. This may be facilitated by first creating a reduction image based on the image. For each pixel, the maximum and minimum depth values may be obtained and recorded for all pixels within a maximum circle of confusion centered at the pixel. These numbers may be used to obtain the depth values used to calculate the blurred pixel color values.

Using these depth values, circles of confusion may be calculated for the subject pixel at each depth value. In some examples, three depth values (for example, near, mid-range, and far) may be used. The circles of confusion may be sized based on the difference between the applicable depth and the depth value of the pixel. A larger difference between the applicable depth and the depth value of the pixel may yield a larger circle of confusion. Conversely, depths at or near the pixel depth value may have a small circle of confusion.

For each circle of confusion, the method may divide the circle of confusion into a number of segments, and retrieve the color value for a representative pixel from each segment. Each representative pixel may be assigned a weight, which may be equal to the size of the segment divided by the size of the circle of confusion.

The blurred color value of the subject pixel may be calculated by adding weighted color values, moving from near to far, until a weight of 1.0 has been obtained. Thus, if the near circle of confusion is full, and therefore has, in total, a weight of 1.0, the mid-range and far circles of confusion need not be analyzed. The blurred value of the subject pixel may be calculated based on the near value, alone. However, if the near circle of confusion has weights that add up to less than 1.0 (i.e. the near circle of confusion is not full), weighted color values for the mid-range circle of confusion may then be retrieved and added to the blurred color value. Similarly, the color values for pixels within the far circle of confusion may not be used unless the weights of the near and mid-range circles of confusion add up to less than 1.0.

In the event that weights are obtained for all depths and add up to less than 1.0, one or more occluded pixels at the near depth or the far depth may be added into the calculation. This may be done, for example, by "hallucinating" a color value for the occluded pixel based the color values of surrounding pixels. Such "hallucinated" pixels may be repeatedly added until the sum of the weights is 1.0.

In this manner, pixels that are occluded by closer pixels may be excluded from the analysis. Calculation of the blurred values may be expedited, particularly for pixels proximate the near depth, since calculations may not need to be performed for pixels at the mid-range and/or far depths. Less blurring may occur for in-focus regions of the image. The result may be an algorithm that provides responsive blurring that can easily be applied and/or adjusted by the user, and may be used on an image that has already been rendered through the use of other image processing techniques.

Thus, the present invention may provide blurring methods that offer speed enhancements over ray tracing, while providing increased accuracy over naive blur filters. The present invention may provide enhanced performance at discontinuities between two object surfaces, as follows:

When the focus is on a nearer surface, the edge of the surface may be relatively sharp, and the method may avoid blending any color from the nearer surface into a far surface;

When the focus is on a more distant surface, the edge of the nearer surface may be blurry; and When the focus is at other distances, the method may provide blurring that generally looks realistic to the user.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DEFINITIONS

Figure 1A:
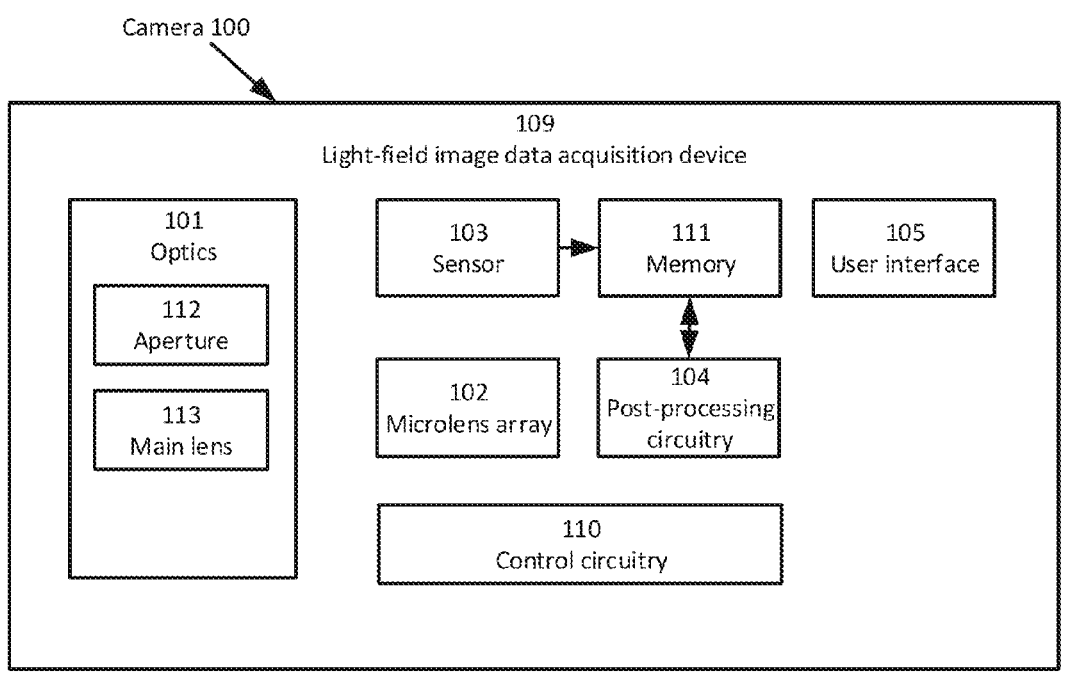
FIG. 1A depicts an example of an architecture for implementing the present invention in a light field capture device, according to one embodiment.

For purposes of the description provided herein, the following definitions are used:

Anterior Nodal Point: the nodal point on the scene side of a lens.

Bayer Pattern: a particular 2×2 pattern of different color filters above pixels on a digital sensor. The filter pattern is 50% green, 25% red and 25% blue.

Circle of Confusion: an optical circle caused by a cone of light rays from a lens to a certain depth within an image. The size of the circle of confusion may depend on how focused the image is at the depth applicable to the circle of confusion.

Center Of Perspective: relative to a scene being photographed, the center of perspective is the point (or locus of points) where light is being captured. Relative to the camera's sensor image, it is the point (or locus of points) from which light is being emitted to the sensor. For a pinhole camera, the pinhole is the center of perspective for both the scene and the sensor image. For a camera with a more complex main lens, the scene-relative center of perspective may be best approximated as either the anterior nodal point of the main lens, or the center of its entrance pupil, and the sensor-relative center of perspective may be best approximated as either the posterior nodal point of the main lens, or as the center of its exit pupil.

CoC: abbreviation for circle of confusion.

CoP: abbreviation for center of perspective.

Disk: a region in a light field image that is illuminated by light passing through a single microlens; may be circular or any other suitable shape.

Entrance Pupil: the image of the aperture of a lens, viewed from the side of the lens that faces the scene.

Exit Pupil: the image of the aperture of a lens, viewed from the side of the lens that faces the image.

Frame: a data entity (stored, for example, in a file) containing a description of the state corresponding to a single captured sensor exposure in a camera. This state may include the sensor image and/or other relevant camera parameters, which may be specified as metadata. The sensor image may be either a raw image or a compressed representation of the raw image.

Image: a two-dimensional array of pixel values, or pixels, each specifying a color.

Lambda (also referred to as "depth"): a measure of distance perpendicular to the primary surface of the microlens array. In at least one embodiment, one lambda may correspond to the gap height between the image sensor and the microlens array (MLA), with lambda=0 being at the MLA plane.

Light field: a collection of rays. A ray's direction specifies a path taken by light, and its color specifies the radiance of light following that path.

Light field image: a two-dimensional image that spatially encodes a four-dimensional light field. The sensor image from a light field camera is a light field image.

Microlens: a small lens, typically one in an array of similar microlenses.

MLA: abbreviation for microlens array.

Nodal Point: the center of a radially symmetric thin lens. For a lens that cannot be treated as thin, one of two points that together act as thin-lens centers, in that any ray that enters one point exits the other along a parallel path.

Picture: a data entity (stored, for example, in a file) containing one or more frames, metadata, and/or data derived from the frames and/or metadata. Metadata can include tags, edit lists, and/or any other descriptive information or state associated with a picture or frame.

Pixel: an n-tuple of intensity values, with an implied meaning for each value. A typical 3-tuple pixel format is RGB, wherein the first value is red intensity, the second green intensity, and the third blue intensity. Also refers to an individual sensor element for capturing data for a pixel.

Posterior Nodal Point: the nodal point on the image side of a lens.

Representative Ray: a single ray that represents all the rays that reach a pixel.

Two-dimensional image (or image): a two-dimensional array of pixels, each specifying a color. The pixels are typically arranged in a square or rectangular Cartesian pattern, but other patterns are possible.

Two-dimensional image processing: any type of changes that may be performed on a two-dimensional image.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light field data. Such a data acquisition device may include optics, sensors, and image processing electronics for acquiring data representative of a scene, using techniques that are well known in the art, are disclosed herein, or could be conceived by a person of skill in the art with the aid of the present disclosure.

One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for processing light field images are described. One skilled in the art will recognize that these various techniques and methods can be performed singly and/or in any suitable combination with one another.

Architecture

In at least one embodiment, the system and method described herein can be implemented in connection with light field images captured by light field capture devices including but not limited to those described in Ng et al., Light field photography with a hand-held plenoptic capture device, Technical Report CSTR 2005-02, Stanford Computer Science.

Figure 1B:
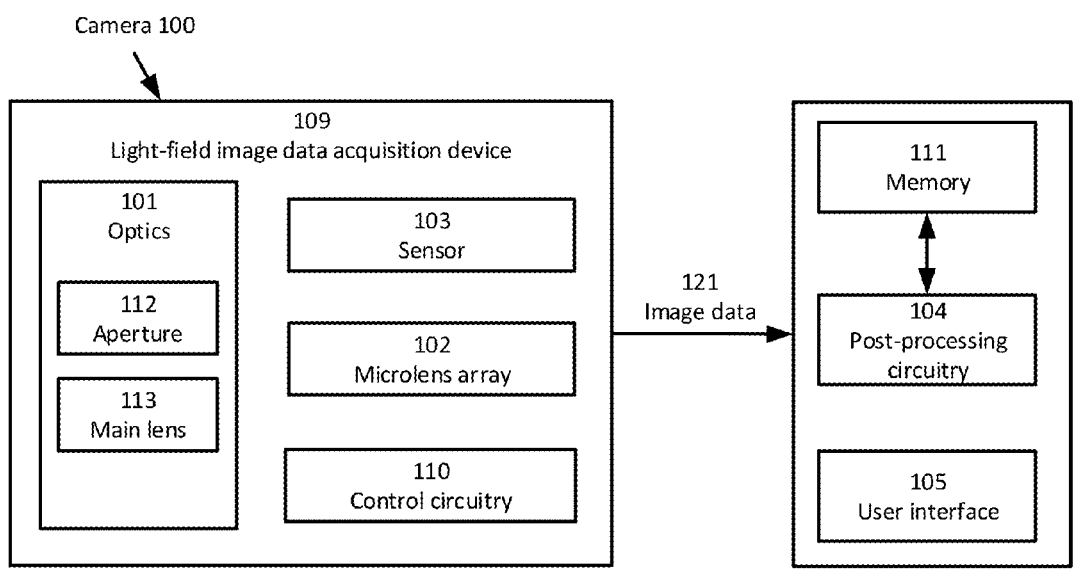
FIG. 1B depicts an example of an architecture for implementing the present invention in a post-processing system communicatively coupled to a light field capture device, according to one embodiment.

Referring now to FIG. 1A, there is shown a block diagram depicting an architecture for implementing the present invention in a light field capture device such as a camera 100. Referring now also to FIG. 1B, there is shown a block diagram depicting an architecture for implementing the present invention in a post-processing system communicatively coupled to a light field capture device such as a camera 100, according to one embodiment. One skilled in the art will recognize that the particular configurations shown in FIGS. 1A and 1B are merely exemplary, and that other architectures are possible for camera 100. One skilled in the art will further recognize that several of the components shown in the configurations of FIGS. 1A and 1B are optional, and may be omitted or reconfigured. Other components as known in the art may additionally or alternatively be added.

In at least one embodiment, camera 100 may be a light field camera that includes light field image data acquisition device 109 having optics 101, image sensor or sensor 103 (including a plurality of individual sensors for capturing pixels), and microlens array 102. Optics 101 may include, for example, aperture 112 for allowing a selectable amount of light into camera 100, and main lens 113 for focusing light toward microlens array 102. In at least one embodiment, microlens array 102 may be disposed and/or incorporated in the optical path of camera 100 (between main lens 113 and sensor 103) so as to facilitate acquisition, capture, sampling of, recording, and/or obtaining light field image data via sensor 103.

Figure 2:
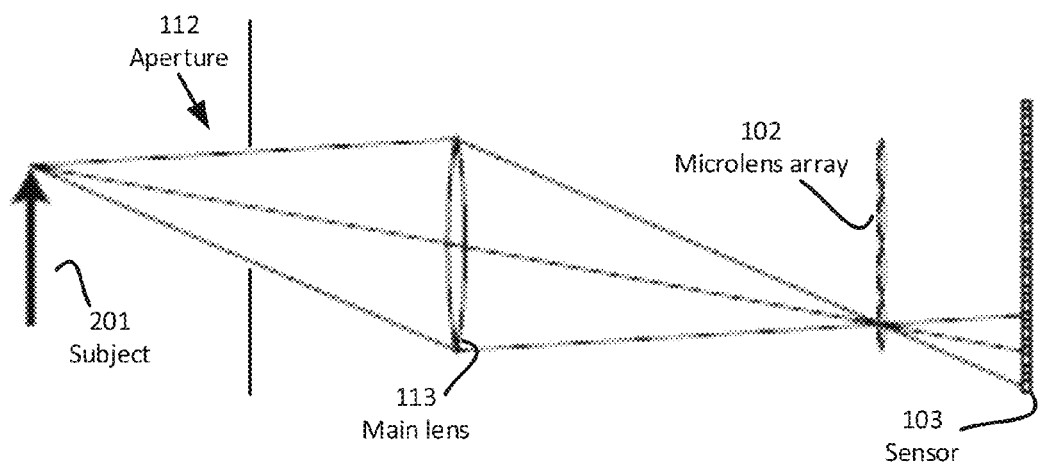
FIG. 2 depicts an example of an architecture for a light field camera for implementing the present invention according to one embodiment.

Referring now also to FIG. 2, there is shown an example of an architecture for a light field camera, or a camera 100, for implementing the present invention according to one embodiment. The Figure is not shown to scale. FIG. 2 shows, in conceptual form, the relationship between aperture 112, main lens 113, microlens array 102, and sensor 103, as such components interact to capture light field data for subject 201.

In at least one embodiment, camera 100 may also include a user interface 105 for allowing a user to provide input for controlling the operation of camera 100 for capturing, acquiring, storing, and/or processing image data.

In at least one embodiment, camera 100 may also include control circuitry 110 for facilitating acquisition, sampling, recording, and/or obtaining light field image data. For example, control circuitry 110 may manage and/or control (automatically or in response to user input) the acquisition timing, rate of acquisition, sampling, capturing, recording, and/or obtaining of light field image data.

In at least one embodiment, camera 100 may include memory 111 for storing image data, such as output by sensor 103. The memory 111 can include external and/or internal memory. In at least one embodiment, memory 111 can be provided at a separate device and/or location from camera 100. For example, camera 100 may store raw light field image data, as output by sensor 103, and/or a representation thereof, such as a compressed image data file. In addition, as described in related U.S. Utility application Ser. No. 12/703,367 for "Light field Camera Image, File and Configuration Data, and Method of Using, Storing and Communicating Same," filed Feb. 10, 2010, memory 111 can also store data representing the characteristics, parameters, and/or configurations (collectively "configuration data") of field image data acquisition device 109.

In at least one embodiment, captured image data is provided to post-processing circuitry 104. Such processing circuitry 104 may be disposed in or integrated into light field image data acquisition device 109, as shown in FIG. 1A, or it may be in a separate component external to light field image data acquisition device 109, as shown in FIG. 1B. Such separate component may be local or remote with respect to light field image data acquisition device 109. The post-processing circuitry 104 may include a processor of any known configuration, including microprocessors, ASICS, and the like. Any suitable wired or wireless protocol can be used for transmitting image data 121 to processing circuitry 104; for example, camera 100 can transmit image data 121 and/or other data via the Internet, a cellular data network, a Wi-Fi network, a Bluetooth communication protocol, and/or any other suitable means.

Overview

Light field images often include a plurality of projections (which may be circular or of other shapes) of aperture 112 of camera 100, each projection taken from a different vantage point on the camera's focal plane. The light field image may be captured on sensor 103. The interposition of microlens array 102 between main lens 113 and sensor 103 causes images of aperture 112 to be formed on sensor 103, each microlens in the microlens array 102 projecting a small image of main-lens aperture 112 onto sensor 103. These aperture-shaped projections are referred to herein as disks, although they need not be circular in shape.

Light field images include four dimensions of information describing light rays impinging on the focal plane of camera 100 (or other capture device). Two spatial dimensions (herein referred to as x and y) are represented by the disks themselves. For example, the spatial resolution of a light field image with 120,000 disks, arranged in a Cartesian pattern 400 wide and 300 high, is 400×300. Two angular dimensions (herein referred to as u and v) are represented as the pixels within an individual disk. For example, the angular resolution of a light field image with 100 pixels within each disk, arranged as a 10×10 Cartesian pattern, is 10×10. This light field image has a four-dimensional (x,y,u,v) resolution of (400,300,10,10).

Figure 3:
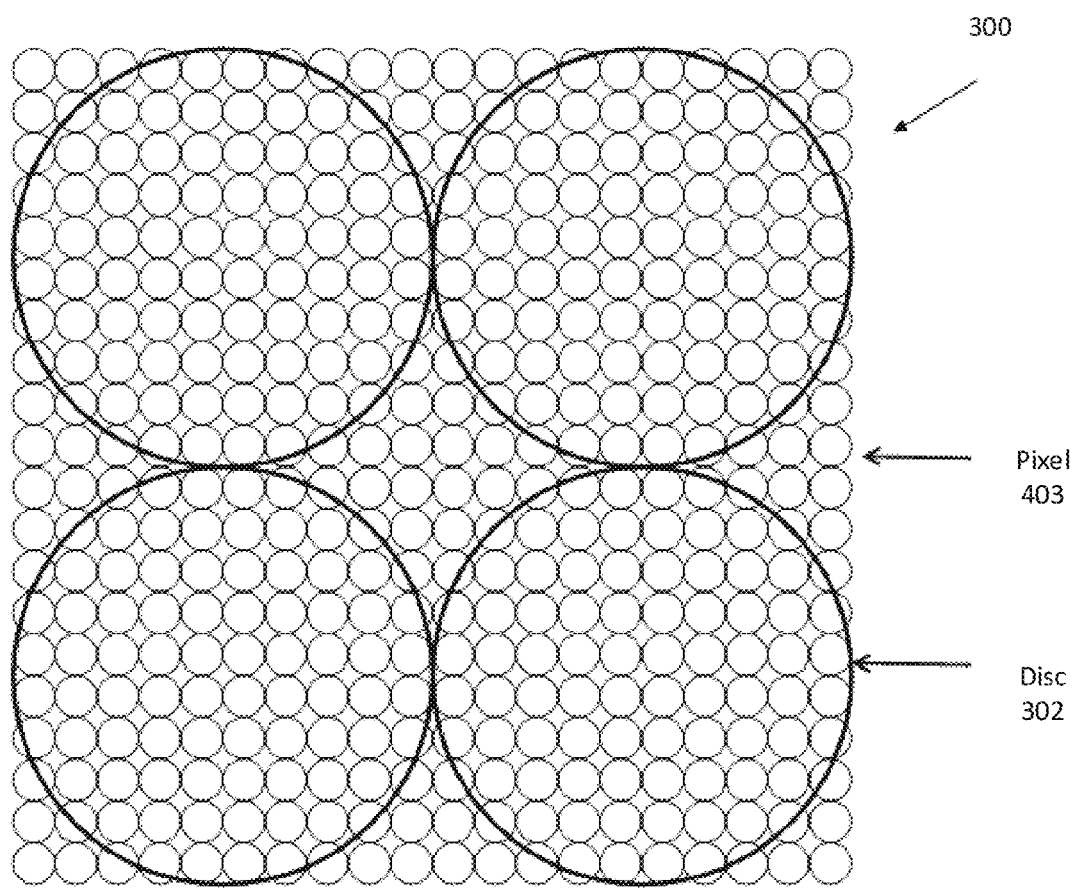
FIG. 3 depicts a portion of a light field image.

Referring now to FIG. 3, there is shown an example of a 2-disk by 2-disk portion 300 of such a light field image, including depictions of disks 302 and individual pixels 403; for illustrative purposes, each disk 302 is ten pixels 403 across. Many light rays in the light field within a light field camera contribute to the illumination of a single pixel 403.

Figure 4:
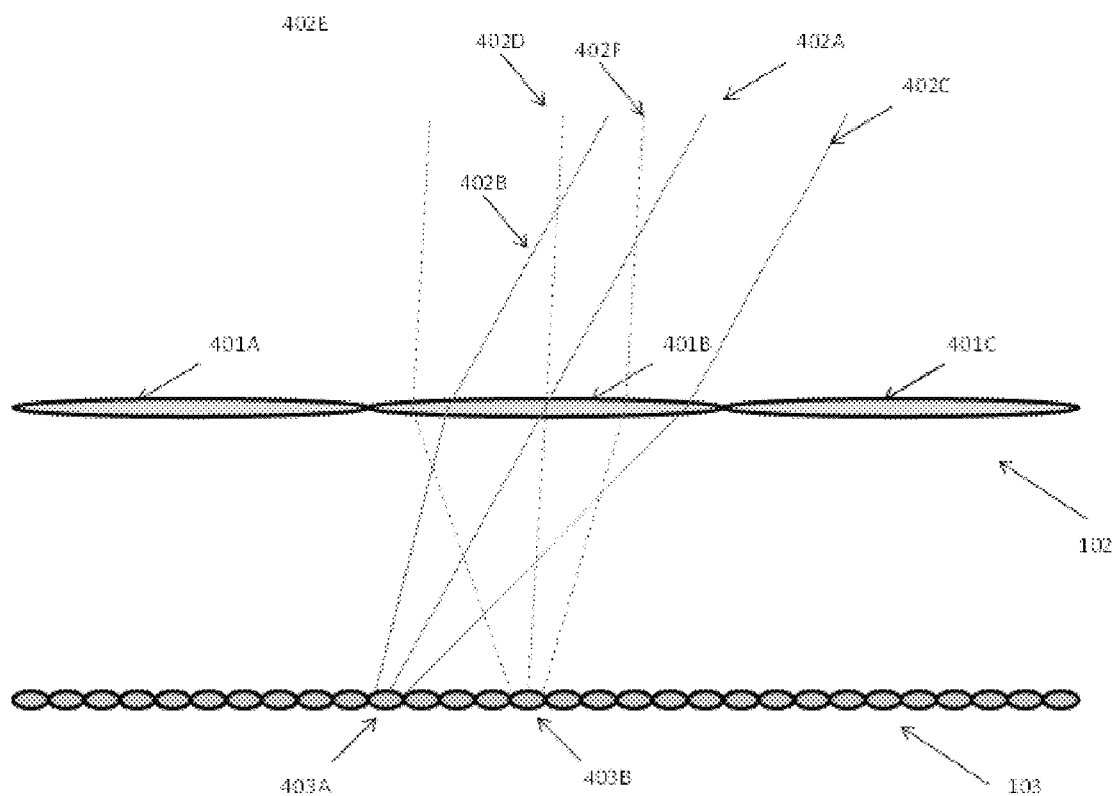
FIG. 4 depicts transmission of light rays through a microlens to illuminate pixels in a digital sensor.

Referring now to FIG. 4, there is shown an example of transmission of light rays 402, including representative rays 402A, 402D, through microlens 401B of the microlens array 102, to illuminate sensor pixels 403A, 403B in sensor 103. In the example of FIG. 4, rays 402A, 402B, 402C (represented by solid lines) illuminate sensor pixel 403A, while dashed rays 402D, 402E, 402F illuminate sensor pixel 403B. The value at each sensor pixel 403 is determined by the sum of the irradiance of all rays 402 that illuminate it. For illustrative and descriptive purposes, however, it may be useful to identify a single geometric ray 402 with each sensor pixel 403. That ray 402 may be chosen to be representative of all the rays 402 that illuminate that sensor pixel 403, and is therefore referred to herein as a representative ray 402. Such representative rays 402 may be chosen as those that pass through the center of a particular microlens 401, and that illuminate the center of a particular sensor pixel 403. In the example of FIG. 4, rays 402A and 402D are depicted as representative rays; both rays 402A, 402D pass through the center of microlens 401B, with ray 402A representing all rays 402 that illuminate sensor pixel 403A and ray 402D representing all rays 402 that illuminate sensor pixel 403B.

There may be a one-to-one relationship between sensor pixels 403 and their representative rays 402. This relationship may be enforced by arranging the (apparent) size and position of main-lens aperture 112, relative to microlens array 102, such that images of aperture 112, as projected onto sensor 103, do not overlap.

Figure 5:
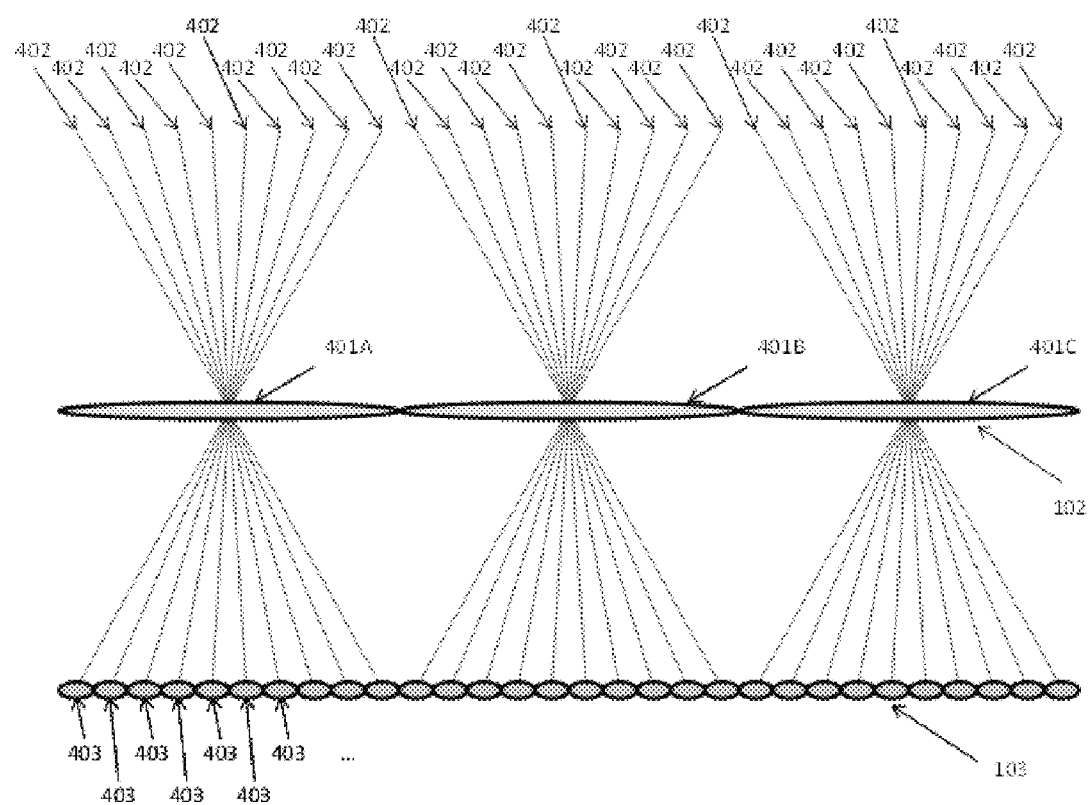
FIG. 5 depicts an arrangement of a light field capture device wherein a microlens array is positioned such that images of a main-lens aperture, as projected onto the digital sensor, do not overlap.

Referring now to FIG. 5, there is shown an example of an arrangement of a light field capture device, such as camera 100, wherein microlens array 102 is positioned such that images of a main-lens aperture 112, as projected onto sensor 103, do not overlap. All rays 402 depicted in FIG. 5 are representative rays 402, as they all pass through the center of one of microlenses 401 to the center of a pixel 403 of sensor 103. In at least one embodiment, the four-dimensional light field representation may be reduced to a two-dimensional image through a process of projection and reconstruction, as described in the above-cited patent applications.

Figure 6:
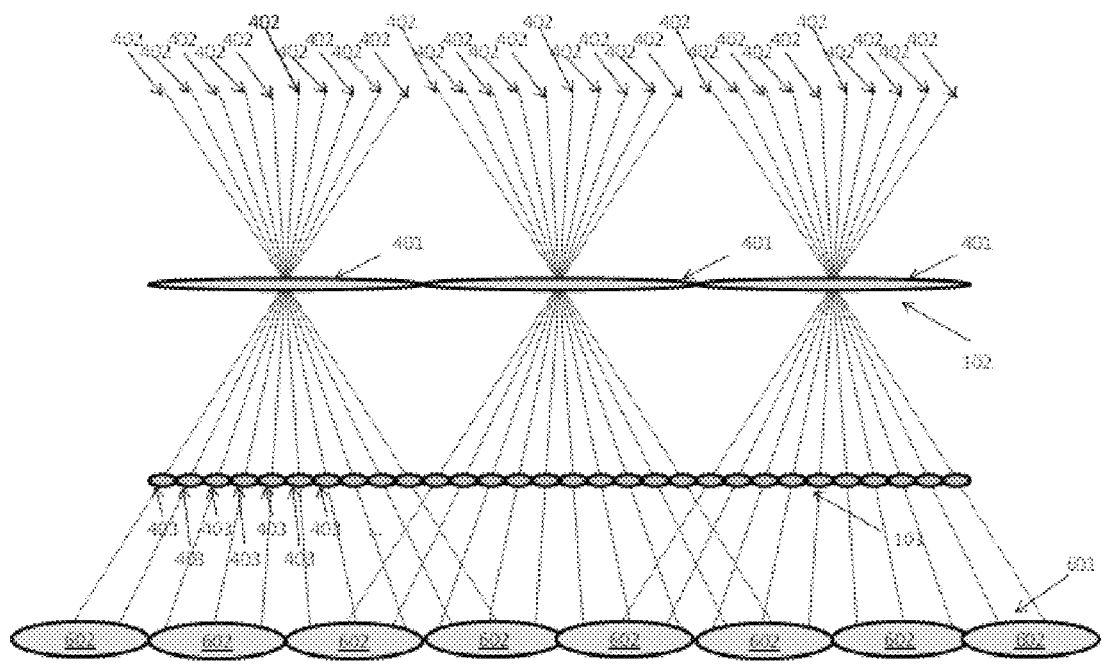
FIG. 6 depicts an example of projection and reconstruction to reduce a four-dimensional light field representation to a two-dimensional image.

Referring now to FIG. 6, there is shown an example of such a process. A virtual surface of projection 601 may be introduced, and the intersection of each representative ray 402 with surface 601 may be computed. Surface 601 may be planar or non-planar. If planar, it may be parallel to microlens array 102 and sensor 103, or it may not be parallel. In general, surface 601 may be positioned at any arbitrary location with respect to microlens array 102 and sensor 103. The color of each representative ray 402 may be taken to be equal to the color of its corresponding pixel. In at least one embodiment, pixels 403 of sensor 103 may include filters arranged in a regular pattern, such as a Bayer pattern, and converted to full-color pixels. Such conversion can take place prior to projection, so that projected rays 402 can be reconstructed without differentiation. Alternatively, separate reconstruction can be performed for each color channel.

The color of an image pixel 602 on projection surface 601 may be computed by summing the colors of representative rays 402 that intersect projection surface 601 within the domain of that image pixel 602. The domain may be within the boundary of the image pixel 602, or may extend beyond the boundary of the image pixel 602. The summation may be weighted, such that different representative rays 402 contribute different fractions to the sum. Ray weights may be assigned, for example, as a function of the location of the intersection between ray 402 and surface 601, relative to the center of a particular pixel 602. Any suitable weighting algorithm can be used, including for example a bilinear weighting algorithm, a bicubic weighting algorithm and/or a Gaussian weighting algorithm.

Image Processing

In at least one embodiment, two-dimensional image processing may be applied after projection and reconstruction. Such two-dimensional image processing can include, for example, any suitable processing intended to improve image quality by reducing noise, sharpening detail, adjusting color, and/or adjusting the tone or contrast of the picture. It can also include effects applied to images for artistic purposes, for example to simulate the look of a vintage camera, to alter colors in certain areas of the image, or to give the picture a non-photorealistic look, for example like a watercolor or charcoal drawing.

One type of image processing that may be carried out is the simulation of a change in the center of perspective (CoP) of an image. This type of processing may distort some portions of the image in order to simulate a change in camera position. With previously known techniques, it may be computationally intensive to carry out further two-dimensional processing techniques with the CoP-shifted image. Image blurring, for example, can be challenging. It would be beneficial to reduce the computation required for post-rendering image blurring so that the blurring process can be more responsive to user input and/or adjustment.

The light field image may be a "mesh image," which may encode not only color values (such as values for red, green, and or blue) but also depth. This may be done, for example, by providing red, green, blue, and depth values for each pixel of the image. This data may be referred to as RGBZ data.

Figure 7A:
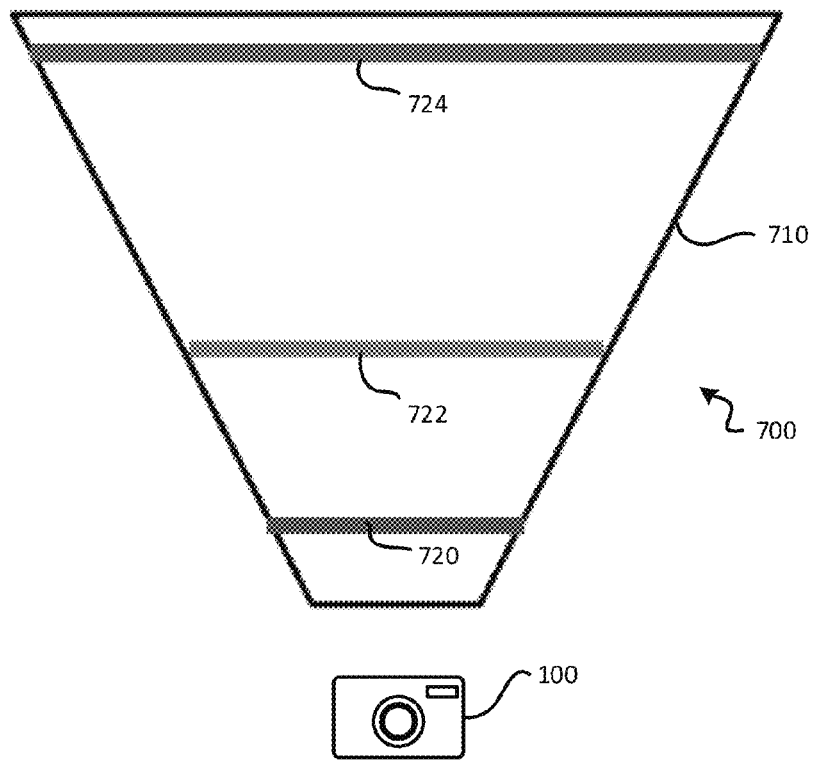
FIGS. 7A and 7B depict an object-space frustum and a corresponding image-space cuboid, respectively.
Figure 7B:
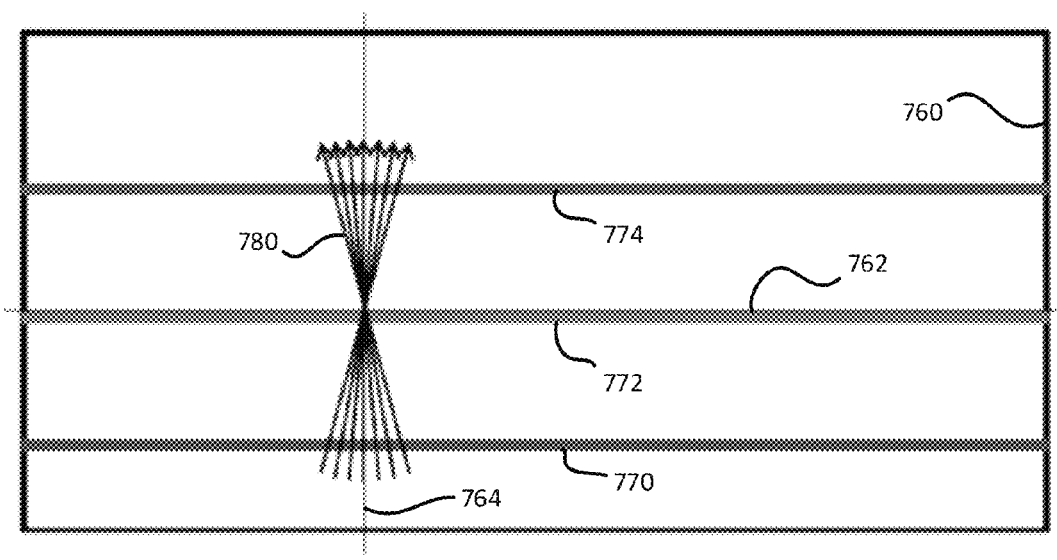

FIGS. 7A and 7B depict an object-space frustum 700 and a corresponding image-space cuboid 750, respectively. The object-space frustum 700 has a field of view 710 that may be generally frustum-shaped (i.e., trapezoidal when viewed from the top, bottom, or side, as in FIG. 7A). The object-space frustum 700 may represent the view captured by the camera 100, which may embody the set of light rays that enters the aperture 112 of the camera 100.

As shown, the object-space frustum 700 may encompass objects positioned at a near depth 720, a mid-range depth 722, and a far depth 724. The camera 100 may be focused at a depth within the object-space frustum 700, which may be proximate or between any of the near depth 720, a mid-range depth 722, and a far depth 724. The object-space frustum 700 may capture a variety of objects (not shown), which may be positioned at various depths within the object-space frustum. Some of the objects (or surfaces thereof) may be visible from the point of view of the camera 100, and others may be occluded by other objects. Further, some of the objects may be near the focus depth, and may therefore be in focus while objects further from the focus depth may be out of focus.

In the resulting image, the object space may be re-shaped into a cuboid shape. Hence, FIG. 7B represents the resulting image in the form of an image-space cuboid 750, as viewed from the top, bottom, or side. The image-space cuboid 750 may also have a field of view 760, which may be generally rectangular in shape. The image-space cuboid 750 may have a focus depth 762 at which objects within the field of view 760 are generally in focus. A pixel position 764 illustrates the position (for example, an x,y coordinate) of a pixel within the image. Since the image-space cuboid 750 is viewed from the top or side in FIG. 7B, the pixel position 764 is viewed as a line that may move along only one axis (i.e., x or y, whichever is orthogonal to the point of view).

Like the object-space frustum 700, the image-space cuboid 750 may have a near depth 770, a mid-range depth 772, and a far depth 774. An exemplary bundle of light rays 780 is shown passing through the pixel position 764; the light rays may converge at the focus depth 762. The aperture diameter of the camera 100 may determine the width of the bundle of light rays 780 that can be received and recorded by the camera 100. The first object intersected by a ray, cast from the viewer onto the scene, may be the object that is visible in the image-space cuboid 750. The color of a portion, or sample, of the image-space cuboid 750 may be the weighted sum of the rays passing through the sample.

Traditional "naive" blurring techniques such as pixel sampling may not provide desirable results for an image like that depicted in the image-space cuboid 750. For example, a circle of confusion at the far depth 774 may be much larger than that at the mid-range depth 772, where the image is in focus. Unless the mid-range depth 772 has some precedence over the far depth 774, the color of an object at the far depth 774 may be used, at least in part, to (undesirably) blur pixels at the mid-range depth 772 that should be positioned in front of the objects at the far depth 774. Thus, objects in the image that should be sharp may be undesirably blurred by the naive blurring process.

Conversely, a ray tracing algorithm may provide accurate blurring, but with a high cost in terms of computational steps. Tracing each of the light rays 780 may properly keep object color values at the far depth 774 from being used to blur an object that is positioned between the object at the far depth 774 and the camera 100. However, ray tracing may require that, for each pixel position 764, each light ray of the light rays 780 is individually computed to determine its impact on the ultimate blurred value of the pixel. Such a process may require considerable computing power. Thus, ray tracing techniques may not provide the speed and/or responsiveness desired for the blurring method.

According to some embodiments of the present invention, blurring may be carried out after the performance of previous rendering techniques such as simulating a change to the center of perspective (CoP) of the camera. Pixels may be blurred by calculating circles of confusion at each of multiple depths within the image. The color values of pixels within nearer circles of confusion may be weighted and taken into account prior to those of circles of confusion at larger depths. Thus, the inaccuracies of naive blurring techniques may be ameliorated without requiring the computational load of ray tracing techniques. Accordingly, relatively rapid, high-quality blurring may be carried out. One method for performing such blurring will be shown and described in connection with FIG. 8 and FIG. 9.

Blurring Method

Figure 8:
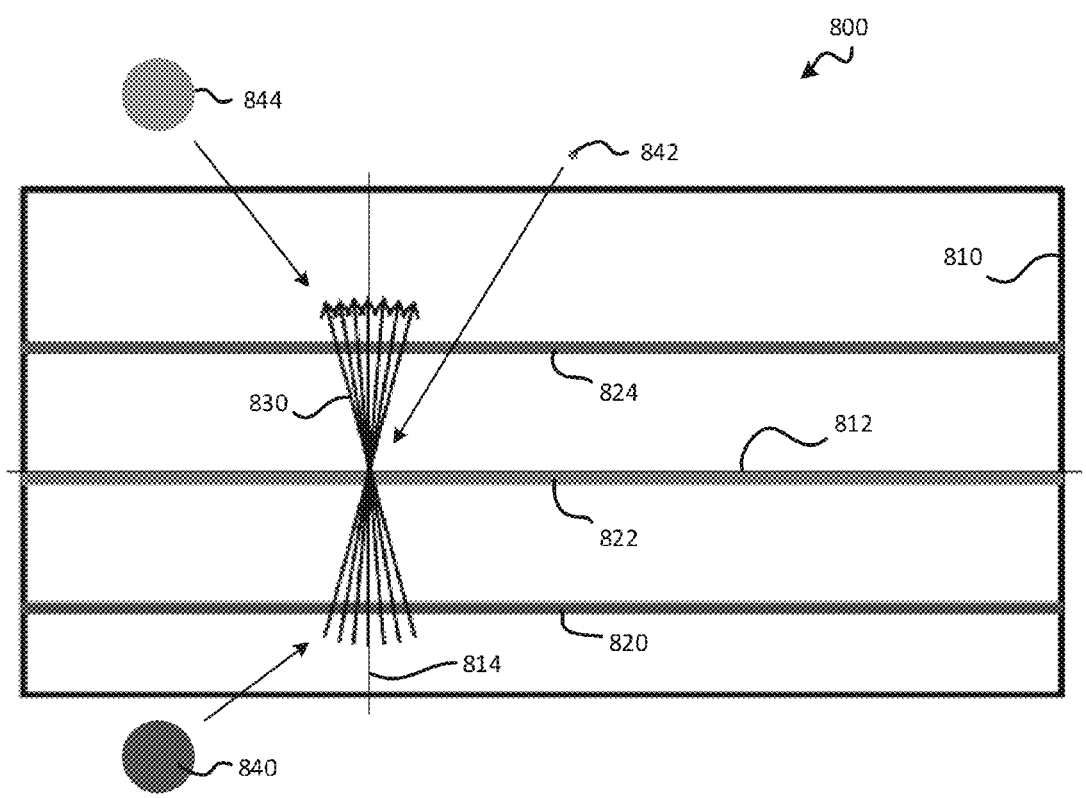
FIG. 8 depicts an image-space cuboid illustrating the establishment of different depth levels, and a corresponding circle of confusion, according to one embodiment of the invention.

FIG. 8 depicts an image-space cuboid 800 illustrating the establishment of different depth levels, and a corresponding circle of confusion, according to one embodiment of the invention. As shown, the image-space cuboid 800 may have a field of view 810 and a focus depth 812. A subject pixel position 814 indicates the location of a pixel under depth blur analysis. The image-space cuboid 800 may have a near depth 820, a mid-range depth 822, and a far depth 824. A bundle of light rays 830 is shown passing through the subject pixel position 814 at the focus depth 812.

The size of a circle of confusion at any given depth level is generally indicated by the size the circle formed by the light rays 830 that pass through that depth. Thus, as shown, the light rays 830 may define a near circle of confusion 840 wherein they intersect the near depth 820, a mid-range circle of confusion 842 where they intersect the mid-range depth 822, and far circle of confusion 844 where they intersect the far depth 824. The near circle of confusion 840, the mid-range circle of confusion 842, and the far circle of confusion 844 are shown merely as examples of relative size. The position of these elements in FIG. 8 is not indicative of their position within the image-space cuboid 800; in actual practice, they will be positioned at the intersection of the light rays 830 with the near depth 820, the mid-range depth 822, and the far depth 824, and will be centered on and oriented perpendicular to the line indicating the subject pixel position 814.

Each circle of confusion may be circular in shape and may be centered on the subject pixel position 814. The near circle of confusion 840 and the far circle of confusion 844 may both be relatively large to reflect a relatively wide dispersal of light rays at the associated depth. Conversely, the mid-range circle of confusion 842 may be very small (for example, one pixel) because the image represented by the image-space cuboid 800 is focused at the mid-range depth 822.

The present invention may utilize methods by which circles of confusion can be calculated for each of multiple depth values for a subject pixel. Then, weighted color values from within each circle of confusion may be taken into account, starting with the nearest depth and proceeding to farther depths until a total weight of 1.0 has been reached. One exemplary method will be shown and described in connection with FIG. 9, and examples of how the method may be applied will be shown and described in connection with FIGS. 10-13.

Figure 9:
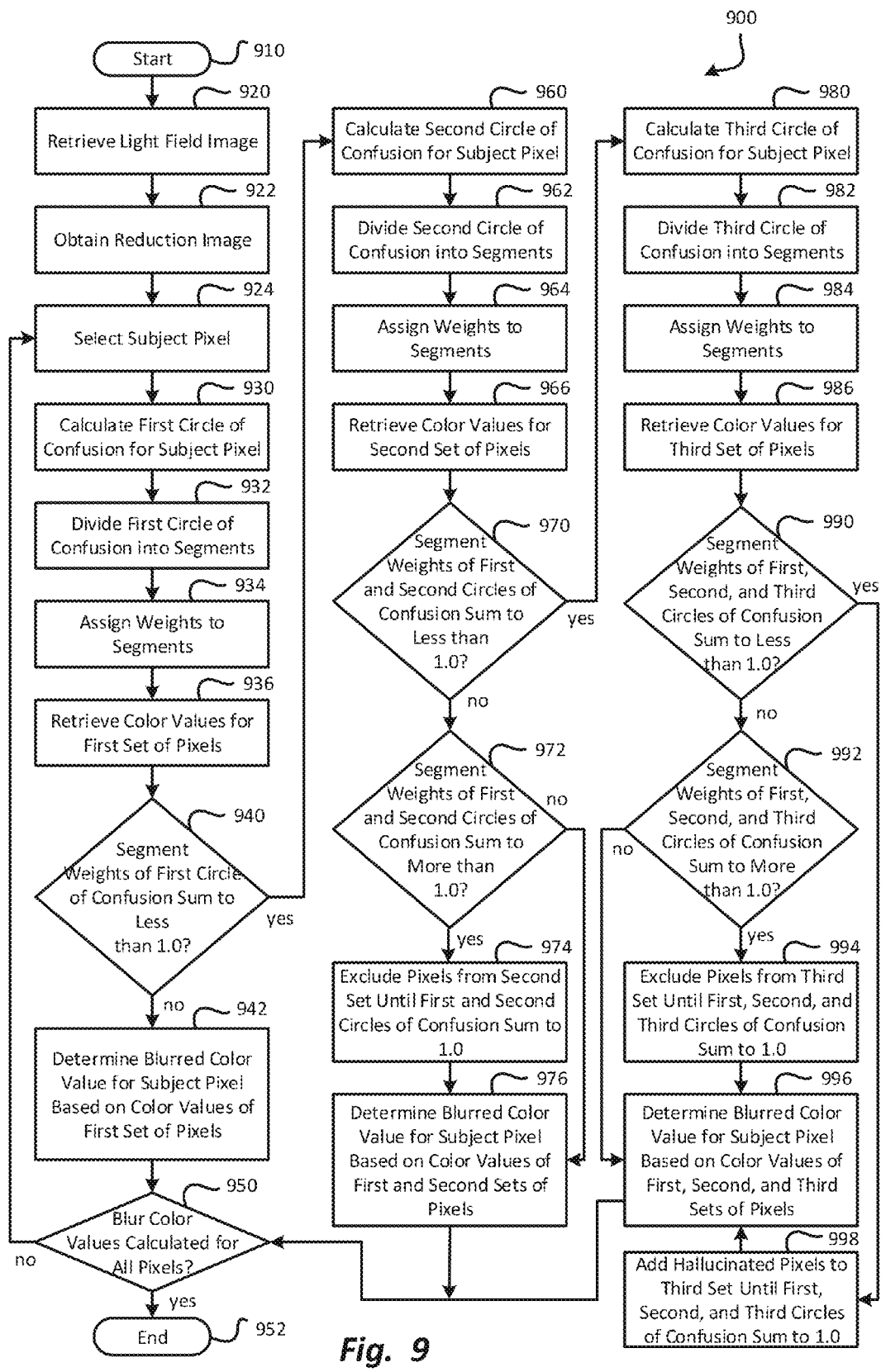
FIG. 9 depicts a flowchart of one method of carrying out high-quality, post-rendering depth blurring according to one embodiment of the invention.

FIG. 9 depicts a flowchart of one method 900 of carrying out high-quality, post-rendering depth blurring according to one embodiment of the invention. As shown, the method 900 may begin with a step 920 in which the subject image, such as a light field image, is retrieved. The light field image may be retrieved from a camera such as the camera 100 of FIG. 1A, from the memory 111 of a separate apparatus as in FIG. 1B, and/or from any other computing device or data storage system. The light field image may be a "mesh image," and may thus have, encoded for each pixel, a color value and a depth value indicating the depth of objects within the scene (such as the image-space cuboid 800 of FIG. 8) at that pixel. The depth values may be multiples of lambda, as defined above.

Once the light field image has been retrieved, in a step 922, a reduction image may be generated based on the light field image. The reduction image may be generated by, for example, computing minimum and maximum depth values for each pixel of the light field image. The minimum and maximum depth values may be calculated for a maximum circle of confusion diameter applicable to the pixel. If desired, the minimum and maximum depth values may be calculated for a diameter slightly larger than that of the maximum circle of confusion diameter in order to account for any warping of the light field image that has occurred during previous processing, such as the simulation of a change in the image center of perspective.

Generation of the reduction image may only need to be carried out one time; the remainder of the method 900 may generally rely on the maximum and minimum depth values of the reduction image. If desired, a single reduction image may be used to expedite multiple blurring processes (for example, to adjust image blur from one configuration to another). Further, if desired, the reduction image may be calculated prior to the remainder of the blurring process. For example, the reduction image may be calculated as the light field image is first captured or recorded, immediately after the completion of a previous image processing step, or at any other time.

After the reduction image has been generated, the method 900 may proceed to a step 924 in which a subject pixel to be blurred is selected. In some embodiments, all pixels of the light field image may be blurred; thus, in further iterations, other subject pixels may be selected. This may be done, for example, by proceeding through each pixel of an image, row-by-row or column-by-column. In other embodiments, some pixels may be excluded from the blurring process. This may be done, for example, based on the coordinates (i.e., x and y) of the pixels within the light field image, the depth of the pixels, the color of the pixels, and/or other factors.

Once the subject pixel has been selected, the method 900 may proceed to a step 930 in which a first circle of confusion is calculated for the subject pixel. This may be, for example, the near circle of confusion 840 of FIG. 8. The first circle of confusion may be the circle of confusion at the nearest depth to be analyzed, which may be the minimum depth recorded in the reduction image for the subject pixel. The first circle of confusion may be designed to encompass pixels of the light field image that have depth values proximate the near depth with x and y coordinates that fall within a generally circular shape centered about the subject pixel. The size of the first circle of confusion may be determined based on the difference between the depth value for the subject pixel and the minimum depth recorded for the subject pixel in the reduction image.

A larger depth differential may lead to a larger circle of confusion. In FIG. 8, this may be illustrated by the fact that the light rays 830 spread further with greater displacement from the mid-range depth 822. Hence, if the near depth 820 is significantly displaced from the mid-range depth 822, the first circle of confusion may be relatively large. Conversely, if the near depth 820 is close to the mid-range depth 822, the first circle of confusion may be relatively small.

Once the first circle of confusion has been calculated, the method 900 may proceed to a step 932 in which the first circle of confusion is divided into segments. Each segment may contain one or more pixels. The segments may be equally sized (for example, equal pie-shaped portions of the first circle of confusion), or may not be equally sized. It may be desirable for each segment to be relatively compact, i.e., to have orthogonal dimensions that are about the same, as opposed to a long, thin configuration. Thus, a representative pixel from each segment may have a color value that is likely similar to that of the remainder of the segment. The segments may be shaped such that the representative pixels can be relatively evenly spaced throughout the first circle of confusion, for example, in a grid pattern, a pattern of concentric circles, or the like. Exemplary segmentation of a circle of confusion will be shown and described in greater detail in connection with FIG. 11 subsequently.

Once the first circle of confusion has been divided into segments, the method 900 may proceed to a step 934 in which weights are assigned to the segments. The weight of a segment may be determined by dividing the area of the segment by the area of the first circle of confusion. As mentioned previously, the segments may be evenly sized, and may thus all have the same weight. Alternatively, the segments may not be evenly sized and may therefore have different weights. In any case, the weights of all segments of a circle of confusion will add up to 1.0.

Once the weights of the segments of the first circle of confusion have been calculated, the method 900 may proceed to a step 936 in which the color values of the representative pixels (i.e., a "first set of pixels") of the first circle of confusion are retrieved. As indicated previously, in at least one embodiment, the representative pixels may include one and only one pixel from each segment. Thus, the first set of pixels may include one pixel from each segments, provided the pixels of each segment are at the proper depth to be present within the first circle of confusion.

Although the first circle of confusion may cover the x and y coordinates of pixels in a circular pattern, some of these pixels may not be positioned proximate the near depth, and may thus not be included in the first set of pixels. Thus, the pixels of the first set of pixels may not necessarily define a circular pattern, but may have edges that reflect the edges or other depth-varying features of objects of the light field image that are present proximate the near depth within the circle.

Once the color values for the first set of pixels have been retrieved, the method 900 may proceed to a query 940 in which a determination is made as to whether the weights of the segments of the first circle of confusion sum to less than 1.0. In at least one embodiment, only segments with a representative pixel within the first circle of confusion (i.e., proximate the near depth 820) are counted. As mentioned previously, the segment weights of the first circle of confusion may all add up to 1.0, but if some representative pixels have depth values that are not proximate the near depth 820, the query 940 may determine that the segment weights sum to less than 1.0.

If the segment weights do not sum to less than 1.0 (i.e., they add up to at least 1.0 because all representative pixels have depth values proximate the near depth 820), no other depths may need to be processed. This is because the first circle of confusion is full and may thus occlude any circles of confusion at greater depths. Accordingly, the method 900 may proceed to a step 942 in which the blurred color value of the subject pixel is determined solely based on the color values of the first set of pixels, which were retrieved in the step 936.

After the blurred value of the subject pixel has been determined in the step 942, the method 900 may proceed to a query 950 in which a determination is made as to whether a blurred color value has been determined for all pixels to be blurred. If so, the method 900 may end 952. If not, the method 900 may return to the step 924 in which a new subject pixel is selected. As indicated previously, the method may blur pixels line-by-line, row-by-row, or in any other pattern until all pixels to be blurred have been processed according to the method 900.

Returning to the query 940, if the segment weights of the first circle of confusion sum to less than 1.0, the first circle of confusion may be deemed to not entirely occlude the next depth (for example, the mid-range depth 822 in FIG. 8). Accordingly, colors of the next depth may need to be processed. This may be carried out in a manner similar to that of the first depth (for example, the near depth 820).

More specifically, the method 900 may proceed to a step 960 in which the second circle of confusion is calculated for the next-nearest depth (for example, the mid-range depth 822 of FIG. 8). The second circle of confusion may be, for example, the mid-range circle of confusion 842 of FIG. 8. The second circle of confusion may be the circle of confusion at the second nearest depth to be analyzed, which may be the depth value at the subject pixel, which may or may not be at the focus distance of the image. In alternative embodiments, mid-range depth may not be the depth value at the subject pixel, but may instead be a different depth, such as a mid-point between the maximum and minimum depths recorded in the reduction image for the subject pixel.

The second circle of confusion may be designed to encompass pixels of the light field image that have depth values proximate the mid-range depth with x and y coordinates that fall within a generally circular shape centered about the subject pixel. The size of the second circle of confusion may be determined based on the difference between the depth value for the subject pixel and the mid-range depth. If the two are equal, the second circle of confusion may be small (i.e., one pixel) like the near circle of confusion 842 of FIG. 8.

Once the second circle of confusion has been calculated, the method 900 may proceed to a step 962 in which the second circle of confusion is divided into segments. Each segment may contain one or more pixels. Like the segments of the first circle of confusion, the segments of the second circle of confusion may or may not be equally sized. The second circle of confusion may have a representative pixel in each segment.

Once the second circle of confusion has been divided into segments, the method 900 may proceed to a step 964 in which weights are assigned to the segments of the second circle of confusion. The weight of a segment may be determined by dividing the area of the segment by the area of the second circle of confusion. Like the first circle of confusion, the weights of all segments of the second circle of confusion will add up to 1.0.

Once the weights of the segments of the second circle of confusion have been calculated, the method 900 may proceed to a step 966 in which the color values of the representative pixels (i.e., a "second set of pixels") of the second circle of confusion are retrieved. Notably, in this application, the word "set" need not refer to multiple items; thus, if the second circle of confusion is only one pixel in size, the second set of pixels may include only the one pixel within the second circle of confusion. In such a case, the second circle of confusion may also have only one segment. Further, as mentioned in connection with the first circle of confusion, some of the representative pixels of the segments of the second circle of confusion may not be positioned proximate the mid-range depth, and therefore may not be included in the second set of pixels.

Once the color values for the second set of pixels have been retrieved, the method 900 may proceed to a query 970 in which a determination is made as to whether the weights of the segments of the first and second circles of confusion, added together, sum to less than 1.0. In at least one embodiment, only segments with a representative pixel within the first and second circles of confusion, proximate the near depth (such as the near depth 820) and the mid-range depth (such as the mid-range depth 822), respectively, are counted.

If the segment weights of the first and second circles of confusion do not sum to less than 1.0 (i.e., they add up to 1.0 or more), no other depths may need to be processed. This is because the first and second circles of confusion may be filled with a sufficient number of representative pixels at the appropriate depth values to generally occlude circles of confusion at greater depths. Notably, since the method 900 may not require the computational steps of a ray tracing algorithm, this may not signify that the first and second circles of confusion, together, fully occlude circles of confusion at greater depth values. Rather, it may signify that the first and second circles of confusion, together, have representative sufficient pixels to provide a relatively accurate blurred color value for the subject pixel without the need to retrieve color values from pixels at greater depths.

Accordingly, if the segment weights of the first and second circles of confusion add up to at least 1.0, the method 900 may proceed to a query 972 in which a determination is made as to whether the segment weights of the first and second circles of confusion sum to more than 1.0. The method 900 may require that the weights of all segments to be considered in the determination of the blurred color value of the subject pixel sum to 1.0.

Thus, if the segments of the first and second circles of confusion sum to more than 1.0, some segments of the second circle of confusion may need to be excluded from the determination of the blurred color value of the subject pixel. Hence, the method 900 may proceed to a step 974 in which pixels from the second set of pixels are excluded (i.e., removed from the second set of pixels) until the first and second circles of confusion sum to 1.0 (or in some embodiments, approximately 1.0 for this and other steps indicated as requiring summation to 1.0). The pixels to be excluded from the second set of pixels may be selected at random. Alternatively, the pixels to be excluded may be selected based on other factors such as the difference in color values between each pixel and other pixels of the second circle of confusion, the difference in color values between each pixel and the subject pixel, the depth value of the pixel, the distance of the pixel (based on its x and y coordinates) from the coordinates of the subject pixel, or the like.

In the alternative to excluding pixels from the second set of pixels, the sum of the segment weights of the first and second circles of confusion may be reduced to 1.0 by scaling down the weights of the second circle of confusion. For example, the first circle of confusion may be half full, leading to a weight sum of 0.5, and the second circle of confusion is full, leading to a weight sum of 1.0 and a total weight sum of 1.5 for the first and second circles of confusion. The weights of each segment of the second circle of confusion may be reduced by 50% to add up to 0.5 so that, when added together, the segment weights of the first and second circles of confusion sum to 1.0.

Once the necessary pixel exclusion and/or segment weight scaling has been applied to cause the segment weights of the first and second circles of confusion to sum to 1.0, or if, pursuant to the query 972, it is determined that the segment weights of the first and second circles of confusion do not sum to more than 1.0, the method 900 may proceed to a step 976. In the step 976, the blurred color value for the subject pixel may be determined based on the color values retrieved for the first and second sets of pixels in the step 936 and the step 966.

After the blurred value of the subject pixel has been determined in the step 976, the method 900 may proceed to the query 950. If a blurred color value has been calculated for all pixels of the light field image that are to be blurred, the method 900 may end 952. If not, the method 900 may return to the step 924 in which a new subject pixel is selected.

Returning to the query 970, if the segment weights of the first and second circles of confusion, together, sum to less than 1.0, the first and second circles of confusion may be deemed to not entirely occlude the next depth (for example, the far depth 824 in FIG. 8). Accordingly, colors of the next depth may need to be processed. This may be carried out in a manner similar to that of the first and second depths (for example, the near depth 820 and the mid-range depth 822).

More specifically, the method 900 may proceed to a step 980 in which the third circle of confusion is calculated for the next-nearest depth (for example, the far depth 824 of FIG. 8). The third circle of confusion may be, for example, the far circle of confusion 844 of FIG. 8. The third circle of confusion may be the circle of confusion at the third nearest depth to be analyzed, which may be the depth value at the maximum depth recorded in the reduction image for the subject pixel. The third circle of confusion may thus be at the largest depth to be processed for blurring. However, in alternative embodiments, more than three depth levels may be processed. In such embodiments, the third circle of confusion may not be at the maximum depth recorded in the reduction image for the subject pixel, but may instead be at a lesser depth so that a subsequent circle of confusion will be at the maximum depth.

Returning to the exemplary embodiment of FIG. 9, the third circle of confusion may be designed to encompass pixels of the light field image that have depth values proximate the far depth with x and y coordinates that fall within a generally circular shape centered about the subject pixel. The size of the third circle of confusion may be determined based on the maximum depth recorded for the subject pixel in the reduction image. A larger depth differential may lead to a larger circle of confusion, as described above in the discussion of the step 930.

Once the third circle of confusion has been calculated, the method 900 may proceed to a step 982 in which the third circle of confusion is divided into segments. Each segment may contain one or more pixels. Like the segments of the first and second circles of confusion, the segments of the third circle of confusion may or may not be equally sized. In at least one embodiment, the third circle of confusion may have a representative pixel in each segment.

Once the third circle of confusion has been divided into segments, the method 900 may proceed to a step 984 in which weights are assigned to the segments of the third circle of confusion. The weight of a segment of the third circle of confusion may be determined by dividing the area of the segment by the area of the third circle of confusion. Like the first and second circles of confusion, the weights of all segments of the third circle of confusion add up to 1.0.

Once the weights of the segments of the third circle of confusion have been calculated, the method 900 may proceed to a step 986 in which the color values of the representative pixels (i.e., a "third set of pixels") of the third circle of confusion are retrieved.

As mentioned previously, a set of pixels may contain only one pixel or any number of pixels. Furthermore, some of the representative pixels of the segments of the third circle of confusion may not be positioned proximate the far depth, and therefore may not be included in the third set of pixels.

Once the color values for the third set of pixels have been retrieved, the method 900 may proceed to a query 990 in which a determination is made as to whether the weights of the segments of the first, second, and third circles of confusion, added together, sum to less than 1.0. In at least one embodiment, only segments with a representative pixel within the first, second, and third circles of confusion, proximate the near depth (such as the near depth 820), the mid-range depth (such as the mid-range depth 822), and the far depth (such as the far depth 824), respectively, are counted.

If the segment weights of the first, second, and third circles of confusion do not sum to less than 1.0 (i.e., they add up to 1.0 or more), no additional color values may need to be added. Accordingly, the method 900 may proceed to a query 992 in which a determination is made as to whether the segment weights of the first, second, and third circles of confusion sum to more than 1.0. As mentioned previously, the method 900 may require that the weights of all segments to be considered in the determination of the blurred color value of the subject pixel sum to 1.0.

Thus, if the segments of the first, second, and third circles of confusion sum to more than 1.0, some segments of the third circle of confusion may need to be excluded from the determination of the blurred color value of the subject pixel. Hence, the method 900 may proceed to a step 994 in which pixels from the third set of pixels are excluded (i.e., removed from the third set of pixels) until the first, second, and third circles of confusion sum to 1.0. As in the step 974, the pixels to be excluded from the third set of pixels may be selected at random or based on other factors such the position, color value, and/or depth value of each pixel.

Once a sufficient number of pixels has been excluded to cause the segment weights of the first, second, and third circles of confusion to sum to 1.0, or if, pursuant to the query 992, it is determined that the segment weights of the first, second, and third circles of confusion do not sum to more than 1.0, the method 900 may proceed to a step 996. In the step 996, the blurred color value for the subject pixel may be determined based on the color values retrieved for the first, second, and third sets of pixels in the step 936, the step 966, and the step 986, respectively.

After the blurred value of the subject pixel has been determined in the step 996, the method 900 may proceed to the query 950. If a blurred color value has been calculated for all pixels of the light field image that are to be blurred, the method 900 may end 952. If not, the method 900 may return to the step 924 in which a new subject pixel is selected.

Returning to the query 990, if the segment weights of the first, second, and third circles of confusion, together, sum to less than 1.0, additional weighted color values may be needed to properly compute the blurred color value of the subject pixel. These additional color values may be obtained in a variety of ways. As mentioned previously, the method 900 envisions the processing of three distinct depths (i.e., near, mid-range, and far) for the light field image. Additional depths may be added if needed. For example, an "extra far" depth beyond the far depth (for example, above the far depth 824 of FIG. 8) may be assessed.

However, it may be simpler and/or less computationally intensive to simply "hallucinate" one or more pixels by extrapolation. Thus, if the weights of the segments of the first, second, and third circles of confusion, together, sum to less than 1.0, the method 900 may proceed to a step 998 in which hallucinated pixels are added to the third set of pixels until the first, second, and third circles of confusion, together, sum to 1.0.

Hallucinating a pixel may entail determining a likely color value for a representative pixel of a segment of the third circle of confusion that is occluded by one or more pixels of the first circle of confusion and/or the second circle of confusion. This may be done, for example, based on the color values of other pixels of the third set of pixels. For example, the color values of the nearest pixels to the hallucinated pixel that are not occluded may be averaged together to provide the color value of the hallucinated pixel. If desired, more complex techniques for determining the color value of the hallucinated pixel may be used, and may take into account a wider range of pixels, the depth values of surrounding pixels, and/or other information that may be used to determine the likely color of a hypothetical pixel at the coordinates and depth of interest.

Once the color value for a hallucinated pixel has been determined, the hallucinated pixel may be added to the third set of pixels as though it were not occluded. Hallucinated pixels may be added to the third set of pixels until the segment weights of the first, second, and third circles of confusion sum to 1.0. When the sum of 1.0 is reached, the method 900 may proceed to the step 996 in which the blurred color value of the subject pixel is determined based on the color values of the first, second, and third sets of pixels, including the color values of any hallucinated pixels. After completion of the step 996, the method 900 may proceed to the query 950, and then to the step 924 or the end 952, as discussed previously.

The method 900 may have a large number of variations. As mentioned previously, the number of depths to be processed for blurring may not be three as in the method 900, but may include fewer depths or more depths. Adding depths may add computational time to the method, but may result in more accurate blurring. Conversely, reducing the number of depths may expedite blurring, but may reduce accuracy.

In other embodiments, various steps and queries of the method 900 may be omitted, replaced with other steps or queries, and/or supplemented with additional steps or queries. The steps and queries of the method 900 may further be reordered and/or reorganized in a wide variety of ways.

EXAMPLES

Examples of application of the method 900 will now be provided. These examples are provided to further illustrate selected ways in which the method 900 may be carried out, but are not intended to limit the invention as claimed.

Figure 10:
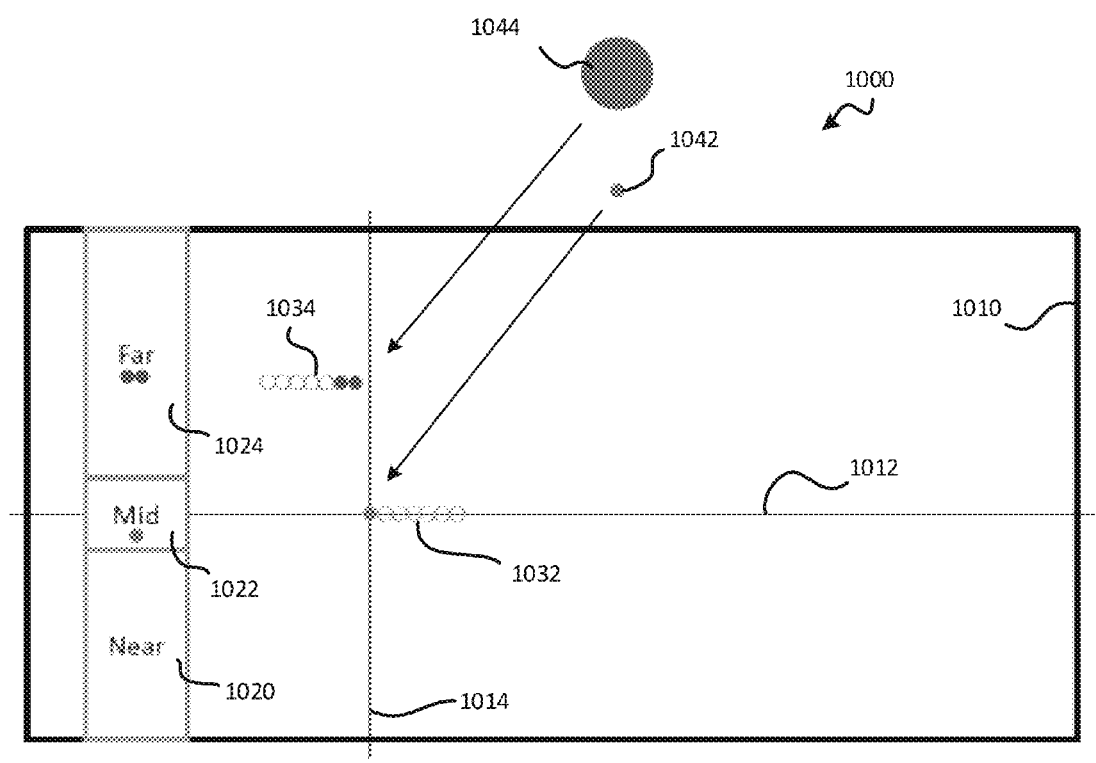
FIG. 10 depicts an image-space cuboid illustrating exemplary application of the method of FIG. 9 to blur a pixel located proximate a boundary between objects located at different depths within the image, according to one embodiment of the invention.

FIG. 10 depicts an image-space cuboid 1000 illustrating exemplary application of the method 900 of FIG. 9 to blur a pixel located proximate a boundary between objects located at different depths within the image, according to one embodiment of the invention. As in FIG. 7B and FIG. 8, the view of FIG. 10 may be from the top, bottom, or side of the space represented in a light field image.

The image-space cuboid 1000 may have a field of view 1010 as shown, with a focus depth 1012. The subject pixel may be positioned at a subject pixel position 1014, which may embody x and y coordinates as set forth previously. The image-space cuboid 1000 may further have a near depth 1020, a mid-range depth 1022, and a far depth 1024, which may be represented along the left-hand side of the image-space cuboid 1000 for clarity. The mid-range depth 1022 may be, but is not necessarily, at the focus depth 1012 of the image-space cuboid 1000.

The light field image used to derive the image-space cuboid 1000 may represent one or more objects at different depths. Thus, the image-space cuboid 1000 may have a mid-range object 1032 positioned proximate the mid-range depth 1022, and a far object 1034 positioned proximate the far depth 1024.

A mid-range circle of confusion 1042 may be present at the subject pixel position 1014, at the mid-range depth 1022. The mid-range circle of confusion 1042 may be only one pixel in size because the mid-range object 1032 may be in perfect focus. A far circle of confusion 1044 may be present at the subject pixel position 1014, at the far depth 1024. The far circle of confusion 1044 may be much larger in size because the far object 1034 may be a significant distance from the mid-range depth 1022. As in FIG. 8, the mid-range circle of confusion 1042 and the far circle of confusion 1044 illustrated in FIG. 10 are shown merely as indicators of relative size.

After selection of the subject pixel (i.e., in the step 924), the method 900 may perform analysis regarding a first circle of confusion (not shown) at the near depth 1020. Since there is no object proximate the near depth 1020 near enough to the subject pixel position 1014 to be within the first circle of confusion (i.e., a near circle of confusion), the first circle of confusion, and thence the first set of pixels, may be empty. Accordingly, in the query 940, the segment weights of the first circle of confusion may sum to less than 1.0 (i.e., zero).

Hence, the second circle of confusion may be calculated and assessed in the step 960 through the step 966. The second circle of confusion may be the mid-range circle of confusion 1042 illustrated in FIG. 10. As mentioned previously, the mid-range circle of confusion 1042 may have only one pixel, which has not been occluded due to the lack of any object in front of the mid-range object 1032 at the subject pixel position 1014. Thus, the mid-range circle of confusion 1042 may have only one segment, which may have a weight of 1.0, and the second set of pixels may include that un-occluded pixel.

Thus, the query 970 may determine that the segment weights of the first and second circles of confusion do not add up to less than 1.0, leading the method 900 to proceed to the query 972. The query 972 may determine that the weights of the first and second circles of confusion do not add up to more than 1.0, leading the method 900 to proceed to the step 976, in which only the color value of the pixel of the second circle of confusion (the mid-range circle of confusion 1042 in this example) is used to determine the blurred color value of the subject pixel. The method 900 may then move on to the next subject pixel, or end.

Figure 11:
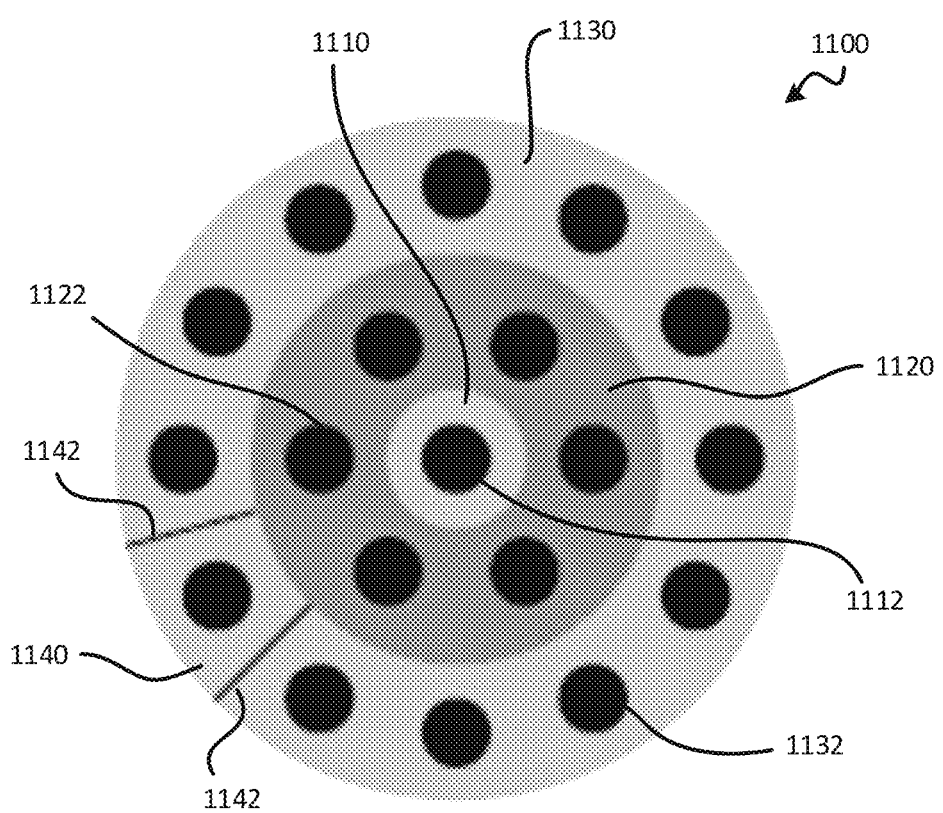
FIG. 11 depicts division of a circle of confusion into segments according to one embodiment of the invention.

FIG. 11 depicts division of a circle of confusion 1100 into segments according to one embodiment of the invention. The circle of confusion 1100 may be, for example, the far circle of confusion 1044 of FIG. 10, or the like. The circle of confusion 1100 may be divided into segments in many different ways. As mentioned previously, it may be beneficial for each segment to have a relatively compact shape, with length and width dimensions that are relatively close to each other.

As shown, the circle of confusion 1100 may be divided into a central circle 1110, an interior ring 1120, and an exterior ring 1130. The central circle 1110, an interior ring 1120, and an exterior ring 1130 may contain a number of representative pixels that may define a set of pixels, such as a first set, second set, or third set of pixels as set forth in the method 900. More specifically, the central circle main contain a central circle pixel 1112, the interior ring 1120 may contain interior ring pixels 1122, and the exterior ring 1130 may contain exterior ring pixels 1132.

The central circle 1110 may contain only one representative pixel and may not be subdivided. Conversely, the interior ring 1120 and the exterior ring 1130 may each be subdivided into segments, each of which contains one pixel of the interior ring pixels 1122 and the exterior ring pixels 1132, respectively. For example, the exterior ring 1130 may be divided into evenly-sized sectors 1140, each of which contains one of the exterior ring pixels 1132. Each of the sectors 1140 may have boundaries 1142 that generally bisect the space between adjacent pixels of the exterior ring pixels 1132. The interior ring 1120 may similarly be divided into sectors (not shown).

Thus, the circle of confusion 1100 may be divided into segments that are approximately equal in size, with representative pixels that are distributed relatively evenly throughout. As mentioned previously, some of the representative pixels of the circle of confusion 1100 may not be at the appropriate depth level for the circle of confusion, and thus their color values may not be retrieved, for example, in the step 936, the step 966, or the step 986. Their segment weights may also not be included in the calculations of the query 940, the query 970, the query 972, the query 990, or the query 992.

Figure 12:
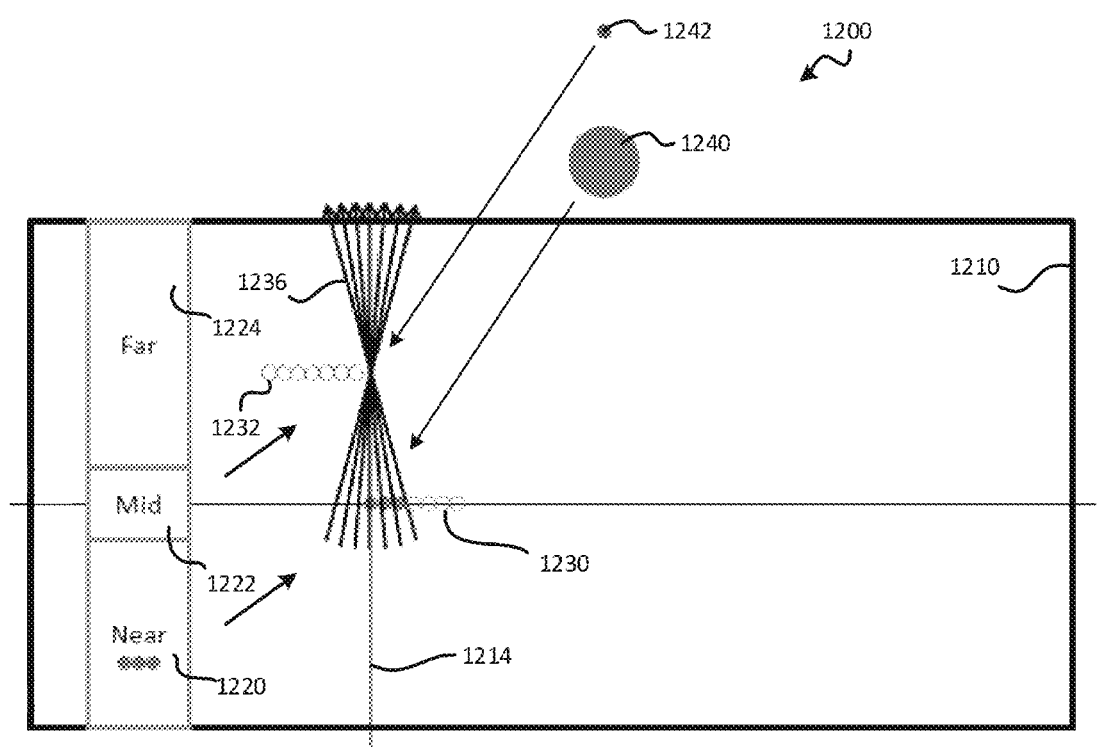
FIG. 12 depicts an image-space cuboid illustrating exemplary application of the method of FIG. 9 to a different image, according to one embodiment of the invention.

FIG. 12 depicts an image-space cuboid 1200 illustrating exemplary application of the method 900 of FIG. 9 to a different image, according to one embodiment of the invention. As shown, the image-space cuboid 1200 may have a field of view 1210. A subject pixel position 1214 is indicated. The image-space cuboid 1200 may represent an image focused at a larger depth than that of the image-space cuboid 1000. As in the image-space cuboids discussed previously, the image-space cuboid 1200 may have a near depth 1220, a mid-range depth 1222, and a far depth 1224.

The image may depict a near object 1230 and a mid-range object 1232, which may both have a relatively large depth due to the larger focus depth of the image. Light rays 1236 are shown centered on the subject pixel position 1214. Intersection of the light rays 1236 with the near depth 1220 and the mid-range depth 1222 may define a near circle of confusion 1240 and a mid-range circle of confusion 1242, respectively. The relatively wide dispersal of the light rays 1236 at the near depth 1220 may cause the near circle of confusion 1240 to be relatively large, while the relatively narrow dispersal of the light rays at the 1236 at the mid-range depth 1222 may cause the mid-range circle of confusion 1242 to be relatively small.

As performed relative to the image-space cuboid 1200, the method 900 may start 910 with the step 920, the step 922, and the step 924. After selection of the subject pixel (i.e., in the step 924), the method 900 may perform analysis regarding the near circle of confusion 1240. As shown, the near object 1230 may have some pixels that lie within the near circle of confusion 1240; these pixels are shown as solid circles in FIG. 12, while those that lie outside of the near circle of confusion 1240 are shown as outlined circles with a white interior. The near object 1230 may, by way of example, occupy 50% of the near circle of confusion 1240. Accordingly, in the query 940, the segment weights of the first circle of confusion may sum to less than 1.0 (i.e., 0.5).

Hence, the second circle of confusion may be calculated and assessed in the step 960 through the step 966. The second circle of confusion may be the mid-range circle of confusion 1242 illustrated in FIG. 12. As shown, the mid-range circle of confusion 1042 may be relatively small and may, for example, have only one pixel. Thus, the mid-range circle of confusion 1042 may have only one segment, which may have a weight of 1.0. However, the mid-range object 1232 does not occupy that pixel; accordingly, the mid-range circle of confusion 1042 may be empty.

Thus, the query 970 may determine that the segment weights of the first and second circles of confusion add up to less than 1.0. However, in this case, the method 900 may be shortened to only include two depth levels. Thus, the method 900, as modified for the example of FIG. 12, may proceed to a step like that of step 998, in which one or more hallucinated pixels are added to the mid-range circle of confusion 1242.

Figure 13:
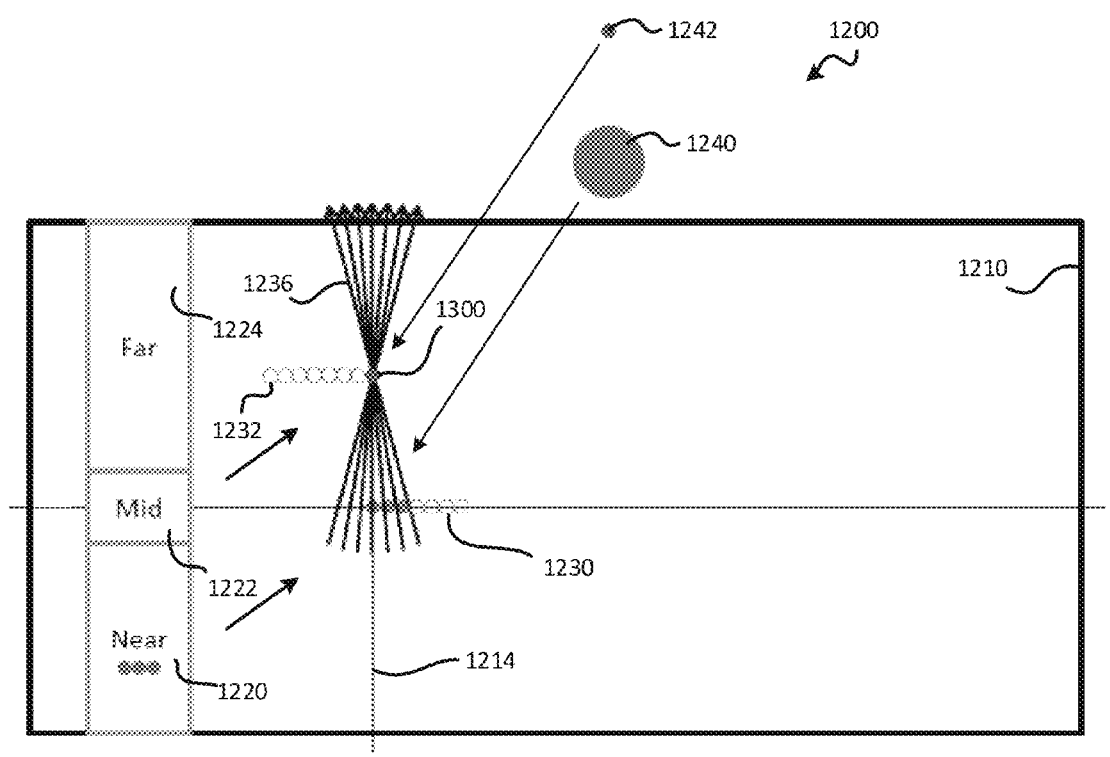
FIG. 13 depicts the image-space cuboid of FIG. 12 after addition of a hallucinated pixel to the second set of pixels, according to one embodiment of the invention.

FIG. 13 depicts the image-space cuboid 1200 of FIG. 12 after addition of a hallucinated pixel 1300 to the second set of pixels within the mid-range circle of confusion 1242, according to one embodiment of the invention. As indicated previously, the color value of each hallucinated pixel may be determined in many ways. In the example of FIG. 13, the hallucinated pixel 1300 has been set to the same color as the adjacent pixels of the mid-range object 1232. Since the mid-range circle of confusion may be only one pixel in size, only one hallucinated pixel 1300 may need to be added.

Then, in a step analogous to the step 974, a portion of the weight of the hallucinated pixel 1300 may be excluded from the summation of weights. This may be done, for example, by reducing the total weight of the mid-range circle of confusion 1242 to 0.5. Thus, the segment weights of the near circle of confusion 1240 and the mid-range circle of confusion 1242 may be made to add up to 1.0, as may be required by the method 900.

Then, in a step analogous to the step 976, the color values of the pixels of the first and second sets of pixels, i.e., the pixels that fall within the near circle of confusion 1240 and the mid-range circle of confusion 1242, may be used to determine the blurred color value of the subject pixel. The blurred color value of the subject pixel may thus be between the color of the near object 1230 and the color of the mid-range object 1232. The method 900 may then move on to the next subject pixel, or end.

As set forth above, the present invention may provide relatively high-quality image blurring that consumes relatively little processing power. Beneficially, the present invention may maintain accuracy at discontinuities between objects at different depths by rendering the edges of near surfaces relatively sharply, avoiding the blend of color from a near surface to a far surface, appropriately blurring surfaces displaced from the focus depth, and/or providing generally realistic blurring effects at other depths. Thus, the present invention may provide enhanced usability and results for post-rendering processing of light field images.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for blurring an image projected from light field data, comprising:
   retrieving an image projected from light field data, wherein the image comprises a plurality of pixels, each of which encodes a color value and a depth value; and
   at a processing device, calculating a blurred color value of a subject pixel of the image by:
      calculating a first circle of confusion proximate coordinates of the subject pixel for a first depth;
      calculating a second circle of confusion proximate coordinates of the subject pixel for a second depth greater than the first depth;
      retrieving the color values for a first set of pixels, wherein each pixel in the first set lies within the first circle of confusion and has a depth value proximate the first depth;
      retrieving the color values for a second set of pixels, wherein each pixel in the second set lies within the second circle of confusion, has a depth value proximate the second depth, and is not occluded by the first set of pixels; and
      selecting the blurred color value based on the color values of the first set of pixels and the color values of the second set of pixels.

2. The computer-implemented method of claim 1, further comprising, prior to calculation of the blurred color value:
   at the processing device, determining the first depth and the second depth for each pixel of the image; and
   at the processing device, recording, in association with each pixel of the image, the first depth and the second depth.

3. The computer-implemented method of claim 2, wherein determining the first depth and the second depth comprises:
   at the processing device, calculating a maximum depth and a minimum depth for all pixels within a maximum circle of confusion diameter of the pixel of the image; and
   at the processing device, setting the minimum depth as the first depth and the maximum depth as the second depth for each pixel of the image.

4. The computer-implemented method of claim 3, wherein calculating the first circle of confusion comprises:
   at the processing device, subtracting the minimum depth for the subject pixel from the depth value of the subject pixel to obtain a depth differential; and
   at the processing device, calculating a size of the first circle of confusion based on the depth differential.

5. The computer-implemented method of claim 1, further comprising, at the processing device, prior to calculation of the blurred color value, warping the image to simulate alteration of a center of perspective of the image.

6. The computer-implemented method of claim 1, wherein retrieving the color values for the first set of pixels comprises:
- at the processing device, selecting only a subset of pixels of the image that lie within the first circle of confusion and have depth values proximate the first depth;
- and wherein selecting the subset of pixels comprises, at the processing device, selecting the subset such that the first set of pixels are substantially evenly distributed throughout the first circle of confusion.

7. The computer-implemented method of claim 1, further comprising:
- at the processing device, calculating a first weight for each of the pixels of the first set of pixels by:
  - dividing the first circle of confusion into a first plurality of segments such that each of the first plurality of segments contains exactly one of the pixels of the first set of pixels; and
  - dividing an area of each of the first plurality of segments by a total area of the first circle of confusion to obtain the first weight; and
- at the processing device, calculating a second weight for each of the pixels of the second set of pixels by:
  - dividing the second circle of confusion into a second plurality of segments such that each of the second plurality of segments contains a pixel of the second set of pixels; and
  - dividing an area of each of the first plurality of segments by a total area of the second circle of confusion to obtain the second weight.

8. The computer-implemented method of claim 7, wherein selecting the blurred color value comprises:
- at the processing device, multiplying the color value of each pixel of the first set of pixels by the first weight to obtain first weighted color values;
- at the processing device, multiplying the color value of each pixel of the second set of pixels by the second weight to obtain second weighted color values; and
- at the processing device, adding the first weighted color values and the second weighted color values together to obtain the blurred color value.

9. The computer-implemented method of claim 8, further comprising, after calculating the first weight for each of the pixels of the first set of pixels and before retrieving the color values for the second set of pixels:
- at the processing device, adding the first weighted color values together to obtain a first weight sum; and
- at the processing device, determining that the first weight sum is less than 1.0.

10. The computer-implemented method of claim 9, further comprising, after calculating the second weight for each of the pixels of the second set of pixels:
- at the processing device, adding the second weighted color values to the first weight sum to obtain a second weight sum;
- at the processing device, determining that the second weight sum is less than 1.0;
- at the processing device, calculating a third circle of confusion proximate coordinates of the subject pixel for a third depth greater than the second depth;
- at the processing device, retrieving the color values for a third set of pixels, each of which lies within the third circle of confusion, has a depth value proximate the third depth, is not occluded by the first set of pixels, and is not occluded by the second set of pixels;
- and wherein selecting the blurred color value further comprises, at the processing device, selecting the blurred color value based on the color values of the third set of pixels.

11. The computer-implemented method of claim 9, further comprising, after calculating the second weight for each of the pixels of the second set of pixels:
- at the processing device, adding the second weighted color values to the first weight sum to obtain a second weight sum;
- at the processing device, determining that the second weight sum is less than 1.0;
- at the processing device, adding a hallucinated pixel to the second set of pixels, wherein the hallucinated pixel lies within the second circle of confusion, has a depth value proximate the second depth, and is occluded by the first set of pixels; and
- at the processing device, prior to selecting the blurred color value, selecting a hallucinated color value for the hallucinated pixel such that the hallucinated color value is similar to the color value of at least one reference pixel of the second set of pixels.

12. The computer-implemented method of claim 9, further comprising, after calculating the second weight for each of the pixels of the second set of pixels:
- at the processing device, adding the second weighted color values to the first weight sum to obtain a second weight sum;
- at the processing device, determining that the second weight sum is greater than 1.0; and
- at the processing device, prior to selecting the blurred color value, removing pixels from the second set of pixels until the second weight sum is substantially equal to 1.0.

13. A non-transitory computer-readable medium for blurring an image projected from light field data, comprising instructions stored theron, that when executed by a processor, perform the steps of:
- retrieving an image projected from light field data, wherein the image comprises a plurality of pixels, each of which encodes a color value and a depth value; and
- calculating a blurred color value of a subject pixel of the image by:
  - calculating a first circle of confusion proximate coordinates of the subject pixel for a first depth;
  - calculating a second circle of confusion proximate coordinates of the subject pixel for a second depth greater than the first depth;
  - retrieving the color values for a first set of pixels, wherein each pixel in the first set lies within the first circle of confusion and has a depth value proximate the first depth;
  - retrieving the color values for a second set of pixels, wherein each pixel in the second set lies within the second circle of confusion, has a depth value proximate the second depth, and is not occluded by the first set of pixels; and
  - selecting the blurred color value based on the color values of the first set of pixels and the color values of the second set of pixels.

14. The non-transitory computer-readable medium of claim 13, further comprising instructions stored thereon, that when executed by a processor, perform the steps of, prior to calculation of the blurred color value:
- determining the first depth and the second depth for each pixel of the image; and
- recording, in association with each pixel of the image, the first depth and the second depth.

15. The non-transitory computer-readable medium of claim 14, wherein determining the first depth and the second depth comprises:
- calculating a maximum depth and a minimum depth for all pixels within a maximum circle of confusion diameter of the pixel of the image; and
- setting the minimum depth as the first depth and the maximum depth as the second depth for each pixel of the image;
- and wherein calculating the first circle of confusion comprises:
- subtracting the minimum depth for the subject pixel from the depth value of the subject pixel to obtain a depth differential; and
- calculating a size of the first circle of confusion based on the depth differential.

16. The non-transitory computer-readable medium of claim 13, further comprising instructions stored thereon, that when executed by a processor, perform the steps of:
- calculating a first weight for each of the pixels of the first set of pixels by:
  - dividing the first circle of confusion into a first plurality of segments such that each of the first plurality of segments contains exactly one of the pixels of the first set of pixels; and
  - dividing an area of each of the first plurality of segments by a total area of the first circle of confusion to obtain the first weight; and
- calculating a second weight for each of the pixels of the second set of pixels by:
  - dividing the second circle of confusion into a second plurality of segments such that each of the second plurality of segments contains a pixel of the second set of pixels; and
  - dividing an area of each of the first plurality of segments by a total area of the second circle of confusion to obtain the second weight;
- and wherein selecting the blurred color value comprises:
- multiplying the color value of each pixel of the first set of pixels by the first weight to obtain first weighted color values;
- multiplying the color value of each pixel of the second set of pixels by the second weight to obtain second weighted color values; and
- adding the first weighted color values and the second weighted color values together to obtain the blurred color value.

17. The non-transitory computer-readable medium of claim 16, further comprising instructions stored thereon, that when executed by a processor, perform the steps of, after calculating the first weight for each of the pixels of the first set of pixels and before retrieving the color values for the second set of pixels:
- adding the first weighted color values together to obtain a first weight sum; and
- determining that the first weight sum is less than 1.0.

18. The non-transitory computer-readable medium of claim 17, further comprising instructions stored thereon, that executed by a processor, perform the steps of, after calculating the second weight for each of the pixels of the second set of pixels:
- adding the second weighted color values to the first weight sum to obtain a second weight sum;
- determining that the second weight sum is less than 1.0;
- calculating a third circle of confusion proximate coordinates of the subject pixel for a third depth greater than the second depth; and
- retrieving the color values for a third set of pixels, each of which lies within the third circle of confusion, has a depth value proximate the third depth, is not occluded by the first set of pixels, and is not occluded by the second set of pixels;
- and wherein selecting the blurred color value further comprises selecting the blurred color value based on the color values of the third set of pixels.

19. The non-transitory computer-readable medium of claim 17, further comprising instructions stored thereon, that when executed by a processor, perform the steps of, after calculating the second weight for each of the pixels of the second set of pixels:
- adding the second weighted color values to the first weight sum to obtain a second weight sum;
- determining that the second weight sum is less than 1.0;
- adding a hallucinated pixel to the second set of pixels, wherein the hallucinated pixel lies within the second circle of confusion, has a depth value proximate the second depth, and is occluded by the first set of pixels; and
- prior to selecting the blurred color value, selecting a hallucinated color value for the hallucinated pixel such that the hallucinated color value is similar to the color value of at least one reference pixel of the second set of pixels.

20. The non-transitory computer-readable medium of claim 17, further comprising instruction stored thereon, that when executed by a processor, perform the steps of, after calculating the second weight for each of the pixels of the second set of pixels:
- adding the second weighted color values to the first weight sum to obtain a second weight sum;
- determining that the second weight sum is greater than 1.0; and
- prior to selecting the blurred color value, removing pixels from the second set of pixels until the second weight sum is substantially equal to 1.0.

21. A system for blurring an image projected from light field data, comprising:
- a storage device, configured to store an image projected from light field data; and
- a processor, communicatively coupled to the storage device, configured to:
  - retrieve the image, wherein the image comprises a plurality of pixels, each of which encodes a color value and a depth value; and
  - calculate a blurred color value of a subject pixel of the image by:
    - calculating a first circle of confusion proximate coordinates of the subject pixel for a first depth;
    - calculating a second circle of confusion proximate coordinates of the subject pixel for a second depth greater than the first depth;
    - retrieving the color values for a first set of pixels, wherein each pixel in the first set lies within the first circle of confusion and has a depth value proximate the first depth;
    - retrieving the color values for a second set of pixels, wherein each pixel in the second set lies within the second circle of confusion, has a depth value proximate the second depth, and is not occluded by the first set of pixels; and
    - selecting the blurred color value based on the color values of the first set of pixels and the color values of the second set of pixels.

22. The system of claim 21, wherein the processor is further configured, prior to calculation of the blurred color value, to:
   determine the first depth and the second depth for each pixel of the image; and
   at the processor, record, in association with each pixel of the image, the first depth and the second depth.

23. The system of claim 22, wherein the processor is further configured to determine the first depth and the second depth by:
   calculating a maximum depth and a minimum depth for all pixels within a maximum circle of confusion diameter of the pixel of the image; and
   setting the minimum depth as the first depth and the maximum depth as the second depth for each pixel of the image;
   and wherein the processor is further configured to calculate the first circle of confusion by:
   subtracting the minimum depth for the subject pixel from the depth value of the subject pixel to obtain a depth differential; and
   calculating a size of the first circle of confusion based on the depth differential.

24. The system of claim 21, wherein the processor is further configured to calculate the blurred color value of the subject pixel by:
   calculating a first weight for each of the pixels of the first set of pixels by:
      dividing the first circle of confusion into a first plurality of segments such that each of the first plurality of segments contains exactly one of the pixels of the first set of pixels; and
      dividing an area of each of the first plurality of segments by a total area of the first circle of confusion to obtain the first weight; and
   calculating a second weight for each of the pixels of the second set of pixels by:
      dividing the second circle of confusion into a second plurality of segments such that each of the second plurality of segments contains a pixel of the second set of pixels; and
      dividing an area of each of the first plurality of segments by a total area of the second circle of confusion to obtain the second weight;
   and wherein the processor is further configured to calculate the blurred color value of the subject pixel by selecting the blurred color value by:
   multiplying the color value of each pixel of the first set of pixels by the first weight to obtain first weighted color values;
   multiplying the color value of each pixel of the second set of pixels by the second weight to obtain second weighted color values; and
   adding the first weighted color values and the second weighted color values together to obtain the blurred color value.

25. The system of claim 24, wherein the processor is further configured to calculate the blurred color value of the subject pixel by, after calculating the first weight for each of the pixels of the first set of pixels and before retrieving the color values for the second set of pixels:
   adding the first weighted color values together to obtain a first weight sum; and
   determining that the first weight sum is less than 1.0.

26. The system of claim 25, wherein the processor is further configured to calculate the blurred color value of the subject pixel by, after calculating the second weight for each of the pixels of the second set of pixels:
   adding the second weighted color values to the first weight sum to obtain a second weight sum;
   determining that the second weight sum is less than 1.0;
   calculating a third circle of confusion proximate coordinates of the subject pixel for a third depth greater than the second depth; and
   retrieving the color values for a third set of pixels, each of which lies within the third circle of confusion, has a depth value proximate the third depth, is not occluded by the first set of pixels, and is not occluded by the second set of pixels;
   and wherein the processor is further configured to select the blurred color value by selecting the blurred color value based on the color values of the third set of pixels.

27. The system of claim 25, wherein the processor is further configured to calculate the blurred color value of the subject pixel by, after calculating the second weight for each of the pixels of the second set of pixels:
   adding the second weighted color values to the first weight sum to obtain a second weight sum;
   determining that the second weight sum is less than 1.0;
   adding a hallucinated pixel to the second set of pixels, wherein the hallucinated pixel lies within the second circle of confusion, has a depth value proximate the second depth, and is occluded by the first set of pixels; and
   prior to selecting the blurred color value, selecting a hallucinated color value for the hallucinated pixel such that the hallucinated color value is similar to the color value of at least one reference pixel of the second set of pixels.

28. The system of claim 25, wherein the processor is further configured to calculate the blurred color value of the subject pixel by, after calculating the second weight for each of the pixels of the second set of pixels:
   adding the second weighted color values to the first weight sum to obtain a second weight sum;
   determining that the second weight sum is greater than 1.0; and
   prior to selecting the blurred color value, removing pixels from the second set of pixels until the second weight sum is substantially equal to 1.0.

\* \* \* \* \*